United States Patent
Dice

(10) Patent No.: US 7,844,973 B1
(45) Date of Patent: Nov. 30, 2010

(54) METHODS AND APPARATUS PROVIDING NON-BLOCKING ACCESS TO A RESOURCE

(75) Inventor: David Dice, Foxborough, MA (US)

(73) Assignee: Oracle America, Inc., Redwood City, CA (US)

( * ) Notice: Subject to any disclaimer, the term of this patent is extended or adjusted under 35 U.S.C. 154(b) by 1682 days.

(21) Appl. No.: 11/008,500

(22) Filed: Dec. 9, 2004

(51) Int. Cl.
G06F 9/46 (2006.01)
G06F 3/00 (2006.01)
G06F 5/00 (2006.01)
G06F 12/00 (2006.01)
G06F 12/14 (2006.01)
G06F 7/00 (2006.01)
G06F 17/30 (2006.01)

(52) U.S. Cl. .................. 718/108; 710/54; 710/200; 719/314; 707/799; 707/800; 718/702

(58) Field of Classification Search .............. 718/714, 718/102, 104, 108; 707/8, 799–800; 710/200, 710/54; 719/314
See application file for complete search history.

(56) References Cited

U.S. PATENT DOCUMENTS

| | | | | |
|---|---|---|---|---|
| 5,450,592 A * | 9/1995 | McLeod | .................. | 718/104 |
| 5,459,864 A * | 10/1995 | Brent et al. | .................. | 718/105 |
| 5,465,363 A * | 11/1995 | Orton et al. | .................. | 718/107 |
| 5,632,032 A * | 5/1997 | Ault et al. | .................. | 718/100 |
| 5,771,383 A * | 6/1998 | Magee et al. | .................. | 719/312 |
| 5,797,004 A * | 8/1998 | Lindholm et al. | .......... | 718/104 |
| 5,826,081 A * | 10/1998 | Zolnowsky | .................. | 718/103 |
| 5,961,583 A * | 10/1999 | Van Fleet | .................. | 718/102 |
| 6,473,820 B1 * | 10/2002 | Zhang | .................. | 710/240 |
| 6,658,451 B1 * | 12/2003 | Chaudhry et al. | .......... | 718/108 |
| 6,728,959 B1 * | 4/2004 | Merkey | .................. | 718/102 |
| 6,748,593 B1 * | 6/2004 | Brenner et al. | .............. | 718/105 |
| 6,782,440 B2 * | 8/2004 | Miller | .................. | 710/200 |
| 6,823,512 B1 * | 11/2004 | Miller et al. | ................ | 718/103 |
| 6,823,518 B1 * | 11/2004 | Bliss et al. | .................. | 719/310 |
| 6,920,635 B1 * | 7/2005 | Lodrige et al. | ............. | 719/314 |
| 6,965,961 B1 * | 11/2005 | Scott | .................. | 710/310 |
| 6,983,461 B2 * | 1/2006 | Hutchison et al. | .......... | 718/104 |
| 7,003,610 B2 * | 2/2006 | Yang et al. | .................. | 710/260 |
| 7,035,870 B2 * | 4/2006 | McGuire et al. | ........ | 707/103 R |
| 7,299,242 B2 * | 11/2007 | Moir et al. | ................ | 707/103 Z |
| 7,318,128 B1 * | 1/2008 | Dice | .................. | 711/151 |
| 7,389,291 B1 * | 6/2008 | Shavit et al. | .................. | 707/8 |
| 7,451,146 B2 * | 11/2008 | Boehm | .................. | 707/8 |
| 7,529,753 B1 * | 5/2009 | Ewing | .................. | 707/10 |

(Continued)

Primary Examiner—Li B Zhen
Assistant Examiner—Adam Lee
(74) Attorney, Agent, or Firm—Brooks Kushman P.C.

(57) ABSTRACT

A system to control access to a resource by a group of threads requiring access to the resource provides exclusive access to the resource within a computerized device on behalf of a first thread by allowing the first thread exclusive access of a monitor associated with the resource. An entry list of threads is maintained that are awaiting access to the monitor using block-free list joining mechanisms including a thread chaining technique, a push/pop technique, and a detach, modify, reattach technique to allow threads to join the entry list of threads without blocking operation of the threads. Upon completion of access to the resource by the first thread, the system operates the first thread to manipulate the entry list of threads to identify a successor thread as being a candidate thread to obtain exclusive access of the monitor to gain exclusive access to the resource.

12 Claims, 9 Drawing Sheets

U.S. PATENT DOCUMENTS

| | | | |
|---|---|---|---|
| 2001/0014905 A1* | 8/2001 | Onodera | 709/102 |
| 2002/0078123 A1* | 6/2002 | Latour | 709/104 |
| 2002/0114338 A1* | 8/2002 | Craig et al. | 370/401 |
| 2002/0184295 A1* | 12/2002 | Bartley | 709/107 |
| 2003/0023656 A1* | 1/2003 | Hutchison et al. | 709/100 |
| 2003/0065892 A1* | 4/2003 | Bonola | 711/147 |
| 2003/0131204 A1* | 7/2003 | Lin et al. | 711/152 |
| 2003/0177164 A1* | 9/2003 | Savov et al. | 709/104 |
| 2003/0182462 A1* | 9/2003 | Moir et al. | 709/310 |
| 2003/0196010 A1* | 10/2003 | Forin et al. | 710/52 |
| 2003/0200457 A1* | 10/2003 | Auslander et al. | 713/200 |
| 2004/0187112 A1* | 9/2004 | Potter, Jr. | 718/100 |
| 2005/0149937 A1* | 7/2005 | Pilkington | 718/102 |
| 2006/0004760 A1* | 1/2006 | Clift et al. | 707/9 |
| 2006/0048149 A1* | 3/2006 | Clift | 718/100 |

* cited by examiner

METHODS AND APPARATUS PROVIDING NON-BLOCKING ACCESS TO A RESOURCE

CROSS-REFERENCE TO RELATED APPLICATIONS

None.

COMPUTER PROGRAM LISTING APPENDIX

A computer program listing is provided on a single compact disc that includes file name "source code.doc" which is hereby incorporated by reference in its entirety.

BACKGROUND

Modern-day computerized devices provide for multiple processing units that allow concurrent execution of software processes. As an example, software execution environments such as most operating systems and the Java™ Virtual Machine allow concurrent execution of sequences of instructions such as sections of code from the same or from different application programs. The sections of code or concurrently operable sequences of instructions are often generally referred to herein as threads. Threads can be separate processes or segments of code of the same or different applications. Because threads can concurrently execute with each other in such computerized devices on the same or on different processing units, situations can arise in which two threads contend for access to a common or shared resource. As an example, two software threads might require access to a shared memory location in order to perform communications with each other (e.g., in a mailbox fashion by placing data into a shared memory area for receipt by the other thread). In such cases, computer system designers have developed several conventional mechanisms that allow each thread to engage in a mutual exclusion or synchronization protocol to allow or provide synchronized access to the resource (i.e., the memory location in this example).

Conventional contention management or synchronization mechanisms provide for an ability to prevent, avoid or recover from the inopportune interleavings of concurrent thread operations. Such inopportune interleavings are commonly called "races" or race conditions. Mutual exclusion is a special case of synchronization where at most one a single thread is permitted access to protected code or data.

A conventional Java Virtual Machine (JVM) provides a mechanism referred to as Java monitors [JVM97] by which threads running application code may participate in a mutual exclusion protocol. Generally, a monitor is either locked (i.e., owned) or unlocked (i.e., free), and only one thread may own the monitor at any one time. Only after acquiring ownership of a monitor may a thread enter a critical section of code (synchronized block) protected by the monitor. If a thread attempts to lock a monitor and the monitor is in an unlocked state, the thread immediately gains ownership of the monitor. If a subsequent thread attempts to gain ownership of the monitor while the monitor is locked, that subsequent thread will not be permitted to proceed into (i.e., execute) the critical section of code until the owning thread releases the lock on the monitor and the subsequent thread manages to gain (or is granted) exclusive ownership of the monitor. Thus to "enter" a monitor means a thread has acquired exclusive ownership of the monitor and enters and begins execution of the associated critical section of code protected by the monitor. Likewise, to "exit" a monitor means to release ownership of the monitor and exit execution of the critical section. A thread that has locked a monitor now "owns" that monitor.

SUMMARY

Conventional mechanisms and techniques that provide for controlled access to a resource suffer from a variety of deficiencies. Embodiments of the invention provide advantages over such conventional system that substantially overcome such deficiencies.

As noted above, conventional monitors are used to control access to a share resource such as shared memory. A conventional monitor object contains an owner field, which identifies the thread that owns the monitor. Also associated with the conventional monitor (i.e., may be incorporated into the monitor structure) is a list of blocked threads referred to herein as an entry list. When the owner field of the monitor is NULL, the monitor is unowned. In conventional thread execution environments such as the Java Virtual Machine (NM), a thread attempts to gain ownership of a monitor by using an atomic instruction such as "CAS" (compare-and-swap—used on SPARC microprocessors made by Sun Microsystems of Santa Clara Calif.), or "cmpxchg" (used on IA32 microprocessors made by Intel Corporation of Storage area network Jose Calif.) to atomically replace a NULL value in the monitor owner field with that thread's non-NULL thread identifier value. If the CAS succeeds the thread is said to own or hold the monitor. If the CAS fails because some other thread owns the monitor and the owner field was non-NULL, the acquiring thread is not permitted to enter the critical section. In this case the acquiring thread spins, locks or blocks itself in order to give other threads an opportunity to run while the blocked thread awaits access to the monitor.

In a spin implementation, an acquiring thread that is denied access to the monitor (i.e., because another thread owns the monitor and is executing a critical code section or accessing some other protected resource) loops, periodically loading the monitor owner field, waiting for the thread that owns the lock to release the lock. In this state, the thread is locked or blocked from proceeding. If the spinning thread loads a NULL value it will then attempt a CAS to try to gain ownership of the lock. If the CAS succeeds then the thread is permitted to enter the critical section, otherwise the thread continues spinning. The spinning thread consumes unnecessary processor cycles that might have otherwise been used to perform useful work by other threads. Spinning is sometimes referred to as "busy waiting". Embodiments of the invention are based in part on the observation that pure spinning does not scale well and wastes computing and operating system resources.

In a blocking implementation, the acquiring thread that is denied access to the monitor blocks itself. In this case, the monitor or critical region is contended (i.e., more than one thread wants ownership of the monitor and the ability to access a critical section of code). Sometime thereafter, the thread that owns the monitor will eventually release the monitor and wake the blocked thread, permitting previously blocked threads to become runnable and again compete for ownership of the monitor. When a thread is blocked awaiting access to the monitor it is not eligible to be dispatched onto a processor by the operating system's scheduler. There may be a list of threads that are blocked, each of them awaiting access to the monitor. Waking a thread makes it again eligible to be dispatched onto a processor. Typically, waking a thread moves the thread onto the scheduler's so-called "ready queue" and the thread is then runnable. Waking a thread from a list usually involves selecting a thread from the list. During this cycle, when a thread blocks itself the scheduler picks some other ready thread from the ready queue and dispatches that thread. If no ready threads are available the processor becomes idle.

The process of joining the list of threads that are awaiting access to the monitor can itself produce contention between threads. This is because when a thread detects the monitor is in use via checking an outer lock on the monitor, to join the list of threads awaiting access to the monitor that thread must obtain an inner lock to obtain exclusive access to the list data structure (e.g., a queue) using an inner lock mechanism. As an example, if a first and second thread are both trying to get on the list of threads awaiting access to the monitor, this itself creates a contention issue because only one thread can join the monitor wait list (the entry list) at one time in order to properly preserve the entry list structure. So a second thread will block, while the other first thread obtains exclusive access to the entry list and adds itself into the entry list. When the that first thread has finished adding itself to the entry list, it can release the lock on the entry list and the other second thread at some point later in time will awake and be able to try to lock the entry list to add itself into the entry list. This creates a context switch for the second thread, because it must block, then re-awake and try to gain ownership of the lock on the entry list. This process of context switching can continue if still other threads are also attempting to join the entry list. Thus the inner locking mechanism used to protect the entry list structure during the process of a thread joining the entry list serves as a source of contention. Embodiments of the invention are based in part on the observation that blocking a thread from joining the entry list results in a double context-switch problem that consumes significant processing resources.

Other conventional hybrid "spin-block" or (spin-then-block) implementations that spin for some period and then revert to blocking are described in the literature referenced at the end of this disclosure. The synchronization subsystems in various conventional Java Virtual Machine implementations use blocking or spin-then-block (STB) strategies. A thread that attempts to lock an already-locked monitor will add itself to a monitor-specific "entry list" and then block itself. The term "entry list" arises from the fact that the threads on the entry list are queued or otherwise placed in the list waiting to enter a critical section protected by the monitor. The entry list is a list of blocked threads that are waiting to acquire the monitor. Blocked threads are ineligible to run and will not be picked to execute by the operating system's short-term scheduler. Blocked threads do not consume any processor cycles. However, when the thread that owns the monitor eventually releases the lock it will pick a thread (sometimes called the "heir presumptive" or a "potential successor" from the entry list and make that thread ready. The successor will eventually be dispatched onto a processor by the operating system's scheduler and that thread then recompetes for ownership of the monitor and will either acquire ownership of the monitor (and be permitted to proceed into the critical section) or, if it fails to acquire ownership, it will again block.

The aforementioned conventional spin-block implementations present problems when used in computer systems. In particular, conventional operating systems provide routines that allow a thread to block itself and for another thread to subsequently wake a blocked thread. When a thread blocks itself a conventional kernel scheduler, the conventional operating system immediately picks another ready thread to run on the processor where the blocking thread previously ran. Threads that are not blocked are either running or ready. A ready thread is not running, but is on the operating system's ready queue and is eligible to run. Waking a blocked thread makes that thread ready. On certain conventional Unix systems such as Solaris made by Sun Microsystems, the primitive to block a thread is called "park" and the primitive to wake a thread is called "unpark." Blocked threads are referred to as "parked", and ready threads are referred to as "runnable." Typically, a short-term scheduler manages all the transitions between ready and running. The conventional synchronization subsystem in the JVM presides over all transitions from ready to blocked (when a contending thread blocks itself) and from blocked to ready (when a thread releasing a lock wakes a successor). In circumstances where conventional implementations use a per-monitor mutual exclusion (mutex) mechanism to lock the entry list and block threads attempting to join the entry list to protect the list order, such conventional implementations have high levels of contention on that mutex. As an example, under high load, a thread may block acquiring the mutex, and then block again while it waits to acquire the monitor. Such double context switching in conventional systems is costly, degrades performance, pollutes the processor caches, and serves to reduce overall performance.

Another problem with conventional implementations that manage contention for resources via a monitor and entry list is that the entry list itself must be maintained correctly in the face of concurrent enqueue and dequeue (i.e., list and delist) operations. Enqueue and dequeue operations in conventional implementations suffer from races (inopportune interleavings) that might corrupt the entry list. To guarantee safe updates of the list, mutual exclusion mechanisms such as spin locks, spin-yield locking, or low-level mutual exclusion primitives are typically used to protect the list as described above. The aforementioned methods that employ mutual exclusion are exposed to such undesirable effects as convoying, priority inversion, deadlock, unduly impeded execution, and restricted parallelism.

Embodiments of the invention significantly reduce such problems by providing block and lock free implementations that allow threads to join an entry list while awaiting access to a monitor while substantially reducing the problems experienced by conventional implementations that are not block or lock free. When contention (concurrency) on the entry list is minimal, both lock-free mechanisms and mutual exclusion provide approximately equal performance. However, as contention increases, lock-free techniques used by embodiments of the invention tend to perform much better than mutual exclusion techniques used in conventional systems. Accordingly, since configurations use lock-free lock lists, they eliminate the requirement to protect the entry list with an inner lock mutex. In other words, embodiments of the invention allow many threads to join the entry list without having to lock the entry list that, as explained above, results in blocking other threads from joining and causes context switching in those other threads.

Specifically, embodiments of the invention provide mechanisms and techniques that include synchronization subsystem for controlling access to a resource (e.g., shared memory) by a group of threads requiring access to the resource. In operation, configurations of the invention provide exclusive access to the resource within the computerized device on behalf of a first thread by allowing the first thread exclusive access of a monitor associated with the resource. Configurations maintain an entry list of threads that are awaiting access to the monitor using a block-free list joining mechanism that allows threads to join the entry list of threads without blocking operation of the threads during the process of joining the entry list of threads. Maintaining an entry list so that threads can join the entry list without blocking can be done using unique configurations that include a thread chaining approach, a push/pop approach, and a detach, modify, reattach approach as will be detailed herein. Upon completion of access to the resource by the first thread, the configurations operate the first thread to manipulate the entry list of threads to identify a successor thread within the entry list of threads as being a candidate thread to obtain exclusive access of the monitor to gain exclusive access to the resource.

The lock-free list implementations are not restricted to symmetric multi-processor (SMP) computer systems that have true parallelism between processors. A uniprocessor with a preemptive scheduler—a scheduler that can involuntarily time-slice threads—can virtualize an SMP system and benefit from the invention. The effect of time slicing is pseudo-concurrency. Thus, the lock-free techniques explained herein apply to preemptive uniprocessors equally as well as true SMP systems As disclosed herein, a synchronization mechanism is lock-free if a "system" is guaranteed to make "useful" forward progress in a finite number of "steps". By "steps" what is mean is processor cycles, and the "system" is composed of a group of threads. As used herein, lock-freedom doesn't guarantee that a specific thread is guaranteed to make progress in a finite number of steps, but rather that at least one of the threads in the system or group of threads is guaranteed to make progress after the group of threads take as a whole has completed a finite number of steps. A conventional program that uses locks, mutexes, or monitors or other mutual exclusion primitives is not "lock free", since the lock-holder might be preempted, suspended, interrupted, take a page fault or otherwise stall. Other threads attempting to enter the critical section and "make progress" are impeded by the stalled lock-holder. Conventional threads that use spin-locks are also not lock-free, even though the thread might not block. Spin-locks don't block (park), so while they may be "block-free", they are not lock-free. A spin lock could spin indefinitely if the lock owner was preempted or stalled, thus violating the "finite steps" constraint. Embodiments of the invention provide lock-free implementations since in the configurations explained herein, threads, when performing the entry list enqueue or dequeue operations, neither block nor spin futilely. Lock-free embodiments disclosed herein thus enjoy the following benefits over conventional mutual-exclusion locks:

1. Better worst-case latency. This is critical for a real-time system. If the lock-holder is stalled, other threads can still make progress, which generally improves the response time of the system.
2. More efficient—less spinning and context switching. The lock-free mechanisms avoid "convoys" of threads. A convoy (sometimes referred to as a "herd") is a group of threads that accumulate waiting for a lock to be released. If the lock-holder is stalled, the convoy can become quite long.
3. Avoid "priority inversion". Suppose a thread T1, which is a low-priority thread acquires lock L. Then, because T1 operates at low-priority, the kernel deschedules (involuntary preempts or time-slices) T1 so other higher priority threads might run. The scheduler dispatches T2, a higher priority thread. T2 is given relatively more compute cycles than T1 by the scheduler. T2 tries to acquire L, but blocks because T1 holds the lock. T2 will not make progress until T1 is scheduled and gets a chance to run, finish the critical section guarded by L, and release L. Thus without the techniques disclosed herein, low priority threads can impede the progress of high priority threads, which works contrary to the desired scheduling policy. There are various conventional remedies, such as having the operating system transiently boost T1's priority to that of T2 while T2 is impeded by T1 (this is called a "priority ceiling protocol" or "priority inheritance protocol"), but such conventional solutions are somewhat tricky. Using lock-free synchronization as disclosed herein is a better way to avoid priority inversion.
4. No chance of deadlock. Deadlock can occur with normal mutual exclusion primitives, but lock-free mechanisms are immune to deadlock.

The configurations disclosed herein, where a contending thread adds itself (or arranges to have itself added) to an entry list for a monitor, are lock-free. In addition, all the "dequeue" operations, where an exiting thread extracts a successor from the entry list are also lock-free and the operators are both lock-free and concurrency-safe. Configurations of this invention operates such that no possible interleaving of multiple, concurrent enqueue and dequeue operations could result in corrupt entry lists.

Other embodiments of the invention include any type of computerized device, workstation, handheld or laptop computer, or the like configured with software and/or circuitry (e.g., a processor) to process any or all of the method operations disclosed herein as embodiments of the invention. In other words, a computerized device or a processor that is programmed or configured to operate as explained herein is considered an embodiment of the invention.

Other embodiments of the invention that are disclosed herein include software programs to perform the method embodiment steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein as embodiments of the invention. Such arrangements of the invention are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein as embodiments of the invention. An example of such a software embodiment is a Java Virtual Machine equipped with a synchronization subsystem configured to operate as explained herein.

It is to be understood that the system of the invention can be embodied strictly as a software program, as software and hardware, or as hardware alone such as within a processor, or within an operating system or another execution environment such as a JVM. Example embodiments of the invention may be implemented within computer systems, processors, and computer program products and/or software applications manufactured by Sun Microsystems Inc. of Palo Alto, Calif., USA.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention.

DETAILED DESCRIPTION

Figure 1:
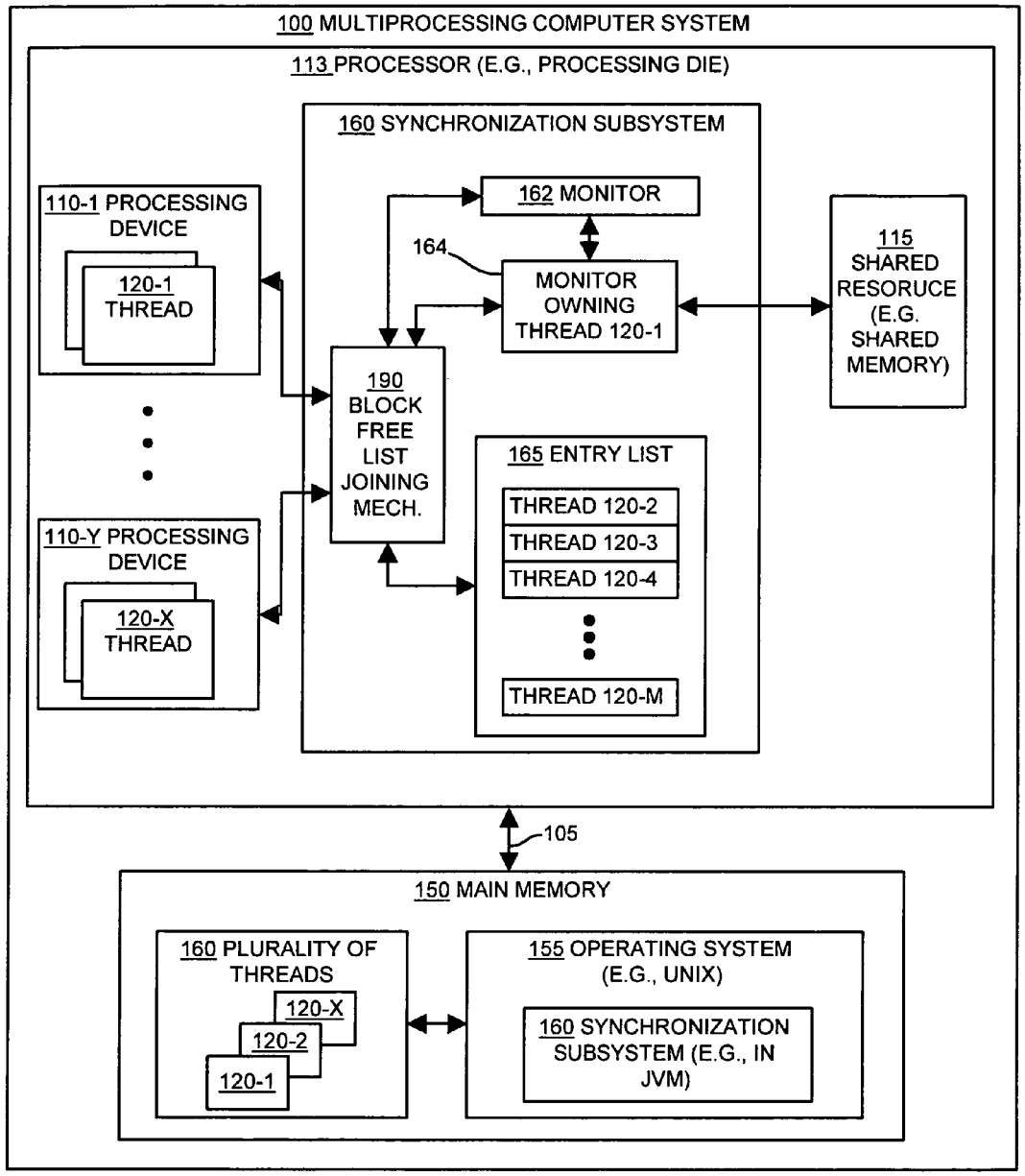
FIG. 1 illustrates an example architecture of the computerized device configured in accordance with one embodiment of the invention.

FIG. 1 illustrates a computer system 100 suitable for use in describing example embodiments of the invention. The computer system 100 includes a main memory 150 containing a group of threads 120-1 through 120-X, and an operating system 155 such as a UNIX variant or Microsoft Windows made by Microsoft Corporation of Redmond, Wash., USA. The operating system 155 includes a synchronization subsystem 160 configured in accordance with embodiments of the invention.

The processor 113 comprises one or more processing devices 110-1 through 110-Y that are each capable of executing one or more threads 120-1 through 120-X in a concurrent or parallel manner. The processing devices 110 may be, for example, processing cores that are each able to concurrently and independently operate within the processor 113, that may be a single processing die. During execution of the threads 120, two or more of the threads 120 may require exclusive access to a shared resource 115, such as shared memory. The synchronization subsystem 160 configured in accordance with embodiments of the invention manages such access by allowing the threads to contend for the resource without blocking (i.e., block free) or using spin-locks (i.e., lock-free) to join the entry list or list 165 within the synchronization subsystem 160, as will be explained.

The synchronization subsystem 160 includes a block free list joining mechanism 190 that manages access to a shared resource 115 using a monitor 162 and an entry list 165 that maintains thread identities 120 according to the techniques explained herein. If no thread 120 is presently accessing a shared resource 115, then the monitor 162 is free to be locked or owned by the next thread 120 requiring exclusive access to the shared resource 115. When a first thread (e.g., 120-1) requests access to the shared resource 115 via the block free list joining mechanism 190, that first thread 120-1 is given (or obtains) ownership of the monitor 162 and is designated by the synchronization subsystem 160 as the monitor owning thread 164 (storing thread identity 120-1 in this example) by storing the first thread identity 120-1 in association with the monitor 162. During a period of time while the first thread 120-1 is accessing a shared resource 115, other threads 120 (e.g., a second thread, third, fourth, etc.) that require or request access to the shared resource 115 use the block free list joining mechanism 190 to be placed into the entry list 165 in accordance with the techniques described herein, such that those other threads are not required to block when attempting to join the entry list 165.

The synchronization subsystem 160 provides several unique mechanisms and techniques for management of threads that require the ability to join or to be added to the entry list 165 in anticipation of becoming the monitor owning thread, such that if two threads are both attempting to join the entry list 165, neither of those threads will require blocking. In addition, once added to the entry list 165, the synchronization system 160 provides unique mechanisms and techniques for removal or selection of a thread within the entry list 165 to be a candidate successor thread to contend for ownership of the monitor 162 after the first thread releases the monitor 162.

One configuration allows a thread that is attempting to join the entry list of threads 165 to engage in a thread chaining technique that enables that thread 120 to create or insert itself into a chain of threads that identifies threads 120 that have each attempted to join the entry list, but are unable to do so because another thread is presently operating in conjunction with the block-free list joining mechanism 190 to join the entry list 165. When the thread joining the list has completed its join operation, it can traverse the chain of threads to add each thread that attempted to join the entry list 165 but was added to the chain instead (because one thread was busy joining). Thus a thread that is busy joining the entry list has the responsibility to join other threads in the entry list 165 if those other threads requested to join while the thread was using the entry list to join itself.

In another configuration for block free entry list management, a concurrent push and exclusive pop mechanism is used to enable any thread that desires the ability to join the entry list to push itself onto the entry list in a concurrent manner with other threads without blocking those other threads. The push/pop configuration also enables the monitor owning thread 164 the exclusive ability to pop a particular thread off the entry list 165 to be used as a candidate successor thread for potential ownership of the monitor 162.

In a third configuration, threads are able to engage in a detach, modify and reattach technique that enables a thread that requires the ability to join the entry list 165 to detach the current copy of the entry list for temporary use as a private copy which it can then manipulate to add itself. After it has added its thread identity to its private list, it attempts to perform a reattach operation which can check to determine if a new entry list 165 has been created since the detachment. If the entry list 165 is modified in the interim, that implies that another thread has detached the entry list and added itself and reattached the entry list while the other thread was performing an add to its own private list. In such cases, the thread can detach the new entry list (i.e., the one detached, added to, and reattached by one or more other threads) and perform a merge operation to merge the second detached new entry list with the formerly detach entry list (the private list) into which that thread placed its identity. This process can be repeated until the private entry list can be reattached as the main entry list without having to perform further detach and merge operations. Thus threads can add themselves without blocking while giving consideration to other threads that join the list while an add is being performed.

Prior to explanation of details of each of these configurations, a high-level overview of processing operations performed by each embodiment of the invention will now be explained with respect to the flowchart of processing steps illustrated in FIG. 2.

Figure 2:
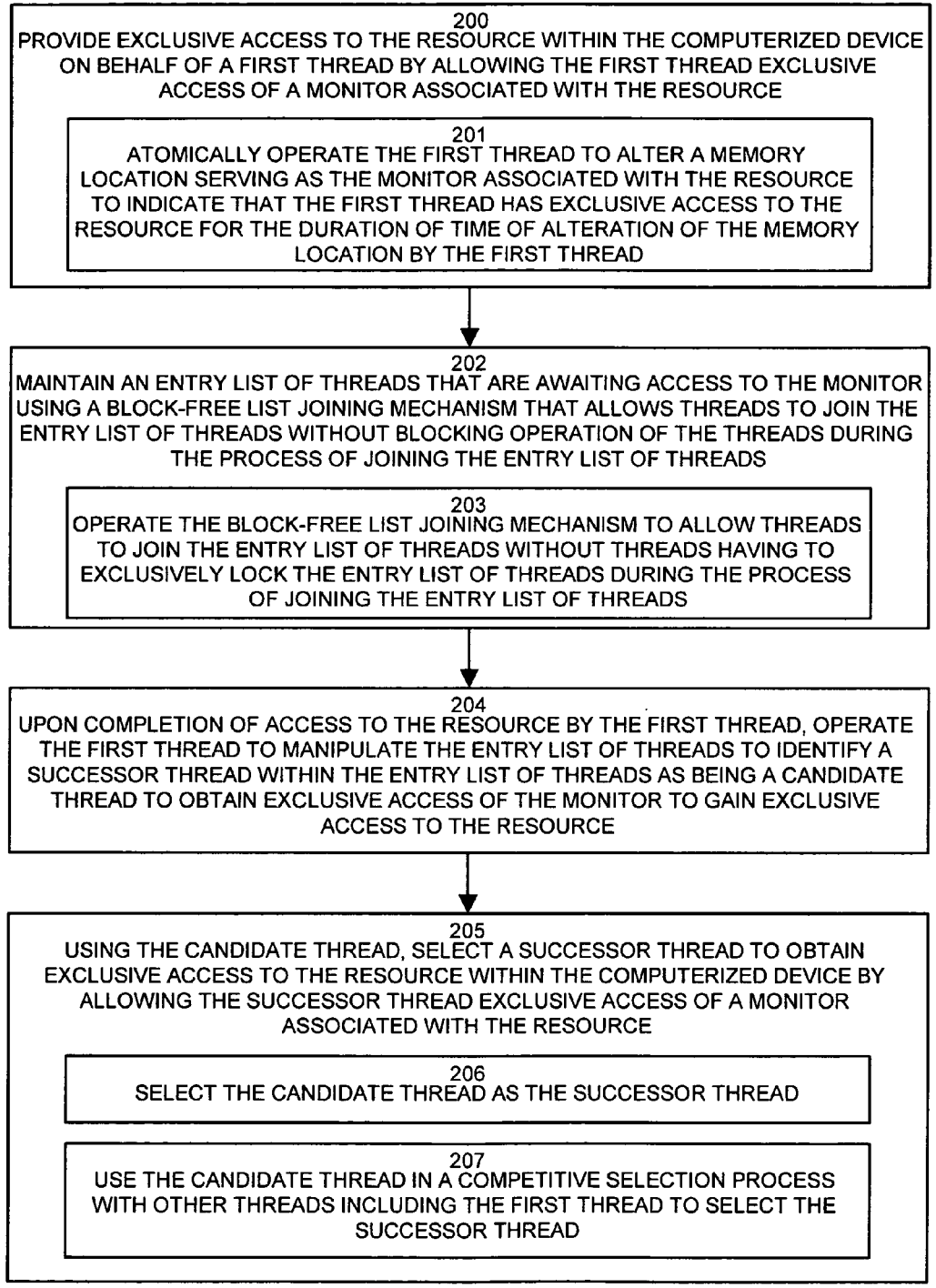
FIG. 2 is a flow chart of processing steps for controlling access to a resource by a group of threads requiring access to the resource in accordance with an example embodiment of the invention.

FIG. 2 is a flow chart of processing steps that teach a method for controlling access to a resource by a group of threads requiring access to the resource in accordance with an example embodiment of the invention.

In step 200, the synchronization subsystem 160 provides exclusive access to the resource 115 within the computerized device on behalf of a first thread 120-1 by allowing the first thread 120-1 exclusive access of the monitor 162 associated with the resource 115. Sub-step 201 shows further details of this processing.

In step 201, the synchronization subsystem 160 atomically operates or allows the first thread 120-1 to alter a memory location 162 serving as the monitor associated with the resource 115 to indicate that the first thread 120-1 has exclusive access to the resource 115 for the duration of time of alteration of the memory location 162 by the first thread. In other words, the process of granting ownership to the monitor is performed atomically so that no other process or thread interferes.

Next, in step 202, as other threads request access to the resource 115, the synchronization subsystem 160 maintains an entry list 165 of threads 120 that are awaiting access to the monitor 162 using a block-free list joining mechanism 190 that allows threads 120 to join the entry list of threads 165 without impeding operation of the threads 120 during the process of joining the entry list of threads 165.

In sub-step 203, in one configuration, the synchronization subsystem 160 operates the block-free list joining mechanism 190 to allow threads to join the entry list of threads without threads having to exclusively lock the entry list 165 of threads during the process of joining the entry list of threads. In this manner, other threads can also join the entry list 165 without blocking since the entry list 165 is not locked.

In step 204, upon completion of access to the resource 115 by the first thread 120-1, the synchronization subsystem 160 operates the first thread 120-1 (or the block free list joining mechanism) to manipulate the entry list of threads 165 to identify a successor thread within the entry list of threads as being a candidate thread to obtain exclusive access of the monitor to gain exclusive access to the resource.

Next, in step 205, the synchronization subsystem 160, using the candidate thread, selects a successor thread to obtain exclusive access to the resource within the computerized device by allowing the successor thread exclusive access of a monitor associated with the resource.

In one configuration that applies a fairness and first-come-first-served approach, the top or head of the entry list 165 identifies the next successor thread. This is shown in step 206, in which the synchronization subsystem 160 selects the candidate thread as the successor thread.

Alternatively, in step 207, the synchronization subsystem 160 uses the candidate thread in a competitive selection process with other threads including the first thread to select the successor thread. Thus the selection of the candidate thread from the entry list after a thread releases ownership of the monitor 162 does not have to mean that the selected candidate thread gets the ownership of the monitor.

Using the aforementioned general processing techniques, embodiments disclosed here and allow threads to join the entry list of threads 165 without blocking. As noted above, there are several mechanisms disclosed here in to support operation of a block free list joining mechanism. The first of such configurations provides a thread chaining mechanism and will now be explained with respect to the flowchart of processing steps in FIG. 3 as well as the architecture illustrated in FIG. 4.

Figure 3:
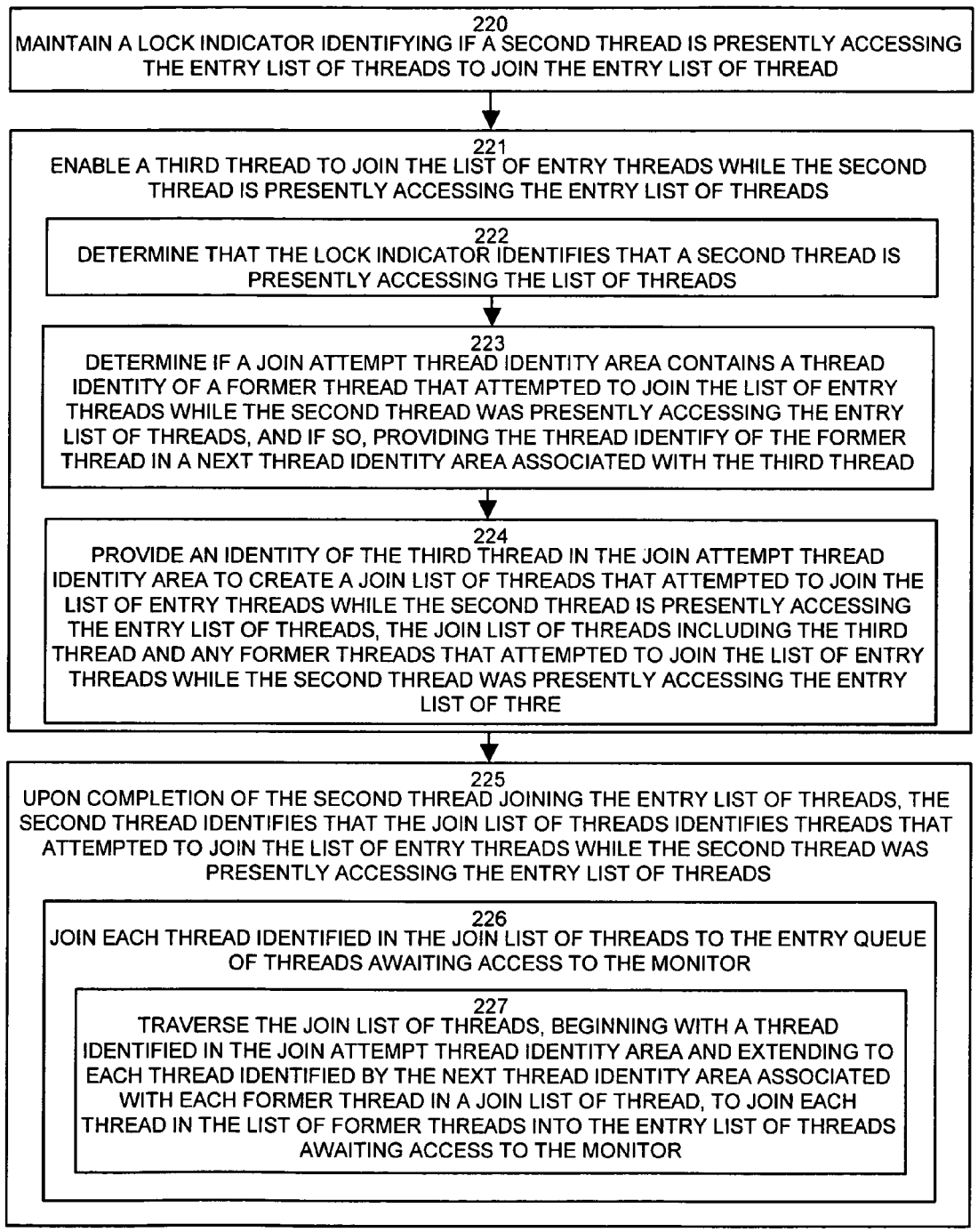
FIG. 3 is a flow chart of processing steps for maintaining an entry list of threads that are awaiting access to the monitor using a thread chaining block-free list joining mechanism in accordance with one example embodiment of the invention.
Figure 4:
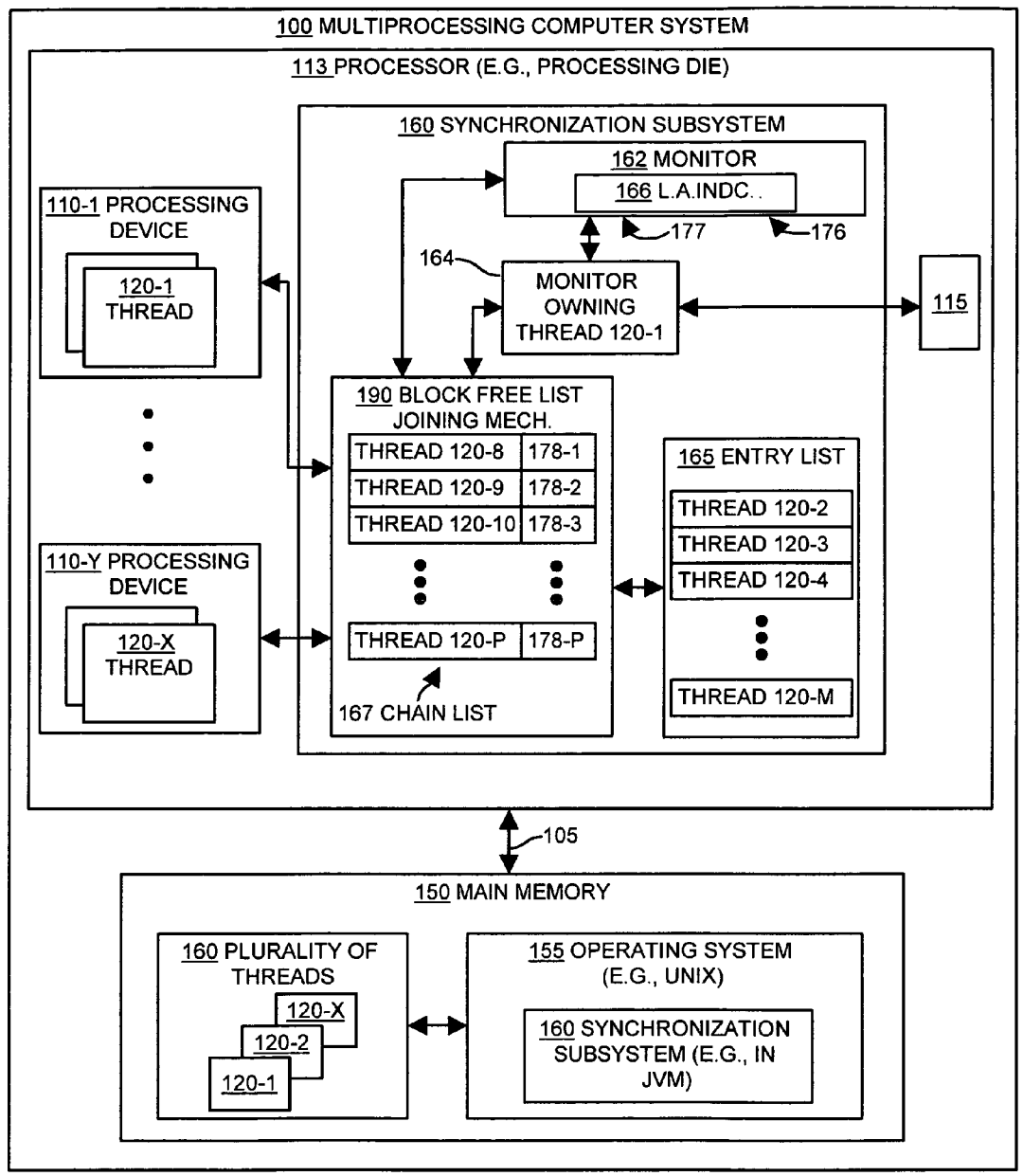
FIG. 4 is an architecture that supports chaining of former and next thread identities in accordance with the processing steps shown in FIG. 3.

FIG. 3 is a flow chart of processing steps that teach details of maintaining an entry list of threads that are awaiting access to the monitor 162 using a thread chaining block-free list joining mechanism 190 and other structures in accordance with one example embodiment of the invention. FIG. 4 is an architecture that illustrates chaining of former and next thread identities in accordance with the processing steps shown in FIG. 3.

Generally, the system disclosed by the steps in FIG. 3 and the architecture in FIG. 4 uses the least significant bit 176 of an entry list monitor or list available indicator 166 to indicate that a thread is busy queuing itself within the entry list 165. The monitor 162 and list access indicator 166 in this example are the same data structure, such as a word in memory. The monitor 162 is thus a "queue word" containing an "exclusive access bit" (X-bit) 176 and a pointer 177 to the head of the entry list 165. In other words, the list available indicator 166 provides for interference-free exclusive access to the entry list 165 and operates as a monitor for this list 165, where as the montiro 162 operates to control access to the resource 115. Note the monitor 162 and list available indicator 166 can be co-located within the same data structure, such as a word in memory. Successive threads that want to join the entry list 165 can do so by placing their address in the upper ordered bits 177 of the list available indicator 166 by fetching this value of the list indicator and placing their value in those bits. As more and more threads 120 attempt to join the entry list 165 (i.e., while it is busy being joined by a second thread that has placed a 1 in the LSB 176 of the list available indicator 166), they will (1) store the previously fetched value of the list available indicator 166 in a next thread identity area 178 within the thread structure 120 that resides as a linked chain of threads 167 awaiting entry into the entry list, and will (2) use CAS to attempt to change the list available indicator 166 field from its previously observed value to the thread's own address. If the CAS fails, the thread loops, retrying the operation. Note that this operation is not futile spinning, as the CAS will fail only if some other threads made useful progress and changed the lock indicator 166. In essence, this creates a chain list of threads 167 awaiting access to the entry list 165 beginning with the thread identified in the upper order bits 177 of the list available indicator 166, whose next thread indicator 178 points to the next thread, whose next points to the next in the chain, and so forth. Thus each next pointer 178 references a next thread in the chain list 167. When the thread 120 that was busy queuing itself in the entry list 165 is completed its task, it can attempt to release the list available indicator 166. However, since the upper ordered bits 177 will contain an address of at least one thread (e.g., thread 120-8 at the top of the chain list 167) that attempted to join the entry list, the thread attempting to release the list available indicator 166 can traverse the chain of threads 167 and add each thread 120 in the chain list 167 to the entry list 165. In this manner, if a thread is busy adding itself to the entry list 165, other threads can simply add themselves to a chain of thread identities 167 and when the thread that just added itself to the entry list has completed its task, it will recognize the now existing chain of thread identities 167 and will add each thread to the entry list 165 on behalf of those threads that added their identities to the chain of thread identities 167.

More specific details of this processing are shown in the flowchart in FIG. 3. For this discussion, assuming first thread 120-1 is the monitor owning thread and has exclusive access over the monitor 162. Further assume that a second thread now desires access to the monitor 162 and thus begins the process of adding itself to the entry list 165. To do so, the second thread operates a list available indicator 166 to set a least significant bit 176 to indicate that the second thread is busy manipulating entry list 165 and ordered to add itself to the entry list.

In step 220, the synchronization subsystem 160 maintains a list available indicator 166 identifying (e.g., via the LSB 167) if a second thread 120-2 is presently accessing the entry list of threads 165 to join the entry list of threads 165. The list available indicator 166 may be, for example, a storage location in memory associated with the computerized device. The list available indicator 166 indicates that a second thread is busy adding itself to the entry list of threads 165.

In step 221, the synchronization subsystem 160 enables a third thread (e.g., 120-8) to join the list of entry threads 165 while the second thread 120-2 is presently accessing the entry list of threads 165. This allows or enables the third thread to join the list of entry threads while the second thread is presently accessing the entry list of threads without blocking the third thread from execution and without requiring the third thread to identify specific instructions to perform to join the list of entry threads. Steps 222 through 224 illustrate details of this processing.

In step 222, the synchronization subsystem 160 determines that the list available indicator 166 identifies that a second thread 120-2 is presently accessing the list of threads 165 (via the LSB 176 being set).

In step 223, the synchronization subsystem 160 determines if a join attempt thread identity area 177 (i.e., the upper ordered bits of the list available indicator 166) contains a thread identity (e.g., an address) of a former thread (e.g., 120-9) that attempted to join the list of entry threads while the second thread 120-2 was presently accessing the entry list of threads 165, and if so, the synchronization subsystem 160 provides the thread identity of the former thread in a next thread identity area 178 associated with the third thread 120-8. In one configuration, the join attempt thread identity area 177 is collocated (i.e., associated) with the list available indicator and the next thread identify area 178 is a next thread field in a thread structure associated with each thread 120.

In step 224, the synchronization subsystem 160 provides an identity of the third thread 120-8 in the join attempt thread identity area 177 to create a join list of threads (e.g., a chain of threads) that attempted to join the list of entry threads while the second thread 120-2 is presently accessing the entry list of threads 165. The join list of threads is the sequence of links 178, including the third thread 120-8 (as identified by bits 177) and any former threads (as identified with the sequence of pointers 178-1 through 178-P) that attempted to join the list of entry threads 165 while the second thread 120-2 was presently accessing the entry list of threads 165. In other words, the chain list 167 has its first thread identified by bits 177 (pointing to thread 120-8, at the top of the list in FIG. 4). The next thread in the chain 167 is thread 120-9 and is referenced by pointer 178-1. Thread 120-9 has a next pointer 178-2 that subsequently points to thread 120-10, and so forth, all the way to thread 120-P, the end of the list whose pointer 178-P would be null.

The operations of providing the thread identity of the former thread in a next thread identity area 178 associated with the third thread, and providing an identity of the third thread in the join attempt thread identity area 177 collectively result in creating a singly-linked list or chain of thread identities 167 including the third thread and any former thread(s). The list or chain of thread identities 167 allows identification, by the second thread 120-2, of other threads 120 that attempted to join the list of entry threads 165 while the second thread 120-2 was accessing the entry list of threads 165.

Accordingly, up to this point in this configuration, as each new thread 120 attempts to add itself to the entry list of threads 165 and if that thread identifies that another thread is busy performing an equivalent process (because bit 176 is set while another thread is accessing the entry list 165), that new thread simply adds its identity to a chain 167 of any other threads that also attempted to add themselves to the entry list 165 while another thread was busy doing so. The new thread then parks itself. When the thread 120-2 that was busy adding itself to the entry list 165 has now completed its task, it can identify the existence of and can traverse the chain 167 identifying all threads that attempted to add themselves during that time (by following the chain 167) and can add those threads to the entry list 165 on behalf of those threads. Stated differently, the thread exiting the processing of adding itself to entry list is responsible for checking a "join list" of other threads that may have attempted to do so and if such a join list exists, the thread that just completed adding itself to the entry list must then add those other threads that attempted to do so but that were unable to do so. Steps 225 through 227 illustrate this processing.

In step 225, upon completion of the second thread 120-2 joining the entry list of threads 165, the second thread 120-2 identifies that the join list of threads (the sequence of pointers 178, beginning with the upper ordered bits of the list available indicator 177) identifies threads that attempted to join the list of entry threads 165 while the second thread 120-2 was presently accessing the entry list of threads 165.

In response, in step 226, the second thread 120-2 performs processing associated with joining each thread identified in the join list of threads 167 (by following the links from 177, to 178-1 through 178-P) to the entry list of threads 165 awaiting access to the monitor.

In step 227, the second thread traverses the join list of threads 167, beginning with a thread 120-8 identified in the join attempt thread identity area 177 and extending to each thread identified by the next thread identity area 178 associated with each former thread in a join list or chain of threads 167, in order to join each thread in the list of former threads 167 into the entry list of threads 165 awaiting access to the monitor 162.

FIG. 4 illustrates the configuration described in FIG. 3 as used by embodiments of the invention. This configuration provides significant enhancements over a mechanism described by Oyama, Taura and Yonezawa. See the [OTY] reference cited at the end of this disclosure, a copy of which is hereby incorporated by reference. Briefly, in Oyama's basic scheme a "Lock" is a single word, initially NULL. The least-significant-bit (LSB) of the word is used as an exclusive access bit. To acquire the lock, a thread first fetches the lock word. If the exclusive access bit is clear, the thread attempts to set the bit with CAS. If successful, the CASing thread is the owner. More precisely, the thread that managed to CAS the LSB from 0 to 1 is the owner. If, upon reading the lock word, the bit is set, the thread instead uses CAS to try to prepend or push a special "delegated action" node onto the list, propagating the exclusive access bit as well. When the owner eventually releases the lock it first reads the lock word. If no delegated actions are queued the lockword will have the exclusive access bit set (and no other bits). In this case the owner uses CAS to attempt to install NULL into the lock word. If the CAS succeeds, the lock is released. If delegated action nodes are present on the list, however, the owner uses CAS to detach the list of delegated actions, leaving the exclusive access bit set.

Having "broken off" the list, the owner then processes the deferred actions on behalf of the contending threads. Once completed, the owner again attempts to swing the Lock word to NULL, repeating the process until no deferred action requests are found. Any thread can prepend to the list, but only the owner can detach the list. In Oyama, requests that arrive while an update is in progress (by the owner) are queued. Before releasing the lock, the owner applies all queued operations on behalf of the threads that attempted to acquire the lock, failed, and instead enqueued a request.

Embodiments disclosed herein provide a mechanism that overcomes problems of the Oyama system. In particular, such configurations of the invention can monitor entry lists and make provide lock-free access as follows. Recall that blocking threads need to add themselves to the entry list, and threads unlocking a monitor need to be able to remove a successor thread from the entry list. Locking (contending) threads simply prepend themselves onto the list and then park. The thread structure serves as the "delegated action" node. The entry list word serves as both the Oyama lock word and the head of entry list. The LSB serves as the "Exclusive list access bit". Unlocking threads attempt to set the LSB with CAS. If an unlocking thread finds that the LSB is already set then that unlocking thread can simply return without waking a successor—because the LSB is set another thread must be in the midst of dequeueing a successor. There is no need for yet another successor; one is sufficient to ensure the required liveness and progress properties for the monitor. If an unlocking thread observes that the entry list LSB is clear, it attempts to detach the list with CAS, leaving the LSB set. It then repairs the list order applying any list discipline to the recently arrived threads, merging the recently arrived threads into the stable list segment at that tail. After dequeueing a successor, the unlocking thread then attempts to reattach the list. If more threads have arrived in the interim, the unlocking thread will detach that segment and re-merge, repeating as necessary.

At any given time the entry list consists of a prefix segment of zero or more recently arrived threads, followed by the sorted body of the list. The prefix takes the form of a singly-linked list. If thread T1 attempts to enqueue itself while the list is locked by some exiting thread T2, T1 simply pushes itself onto the front of the list, delegating the responsibility for properly enqueueing T1 to T2. T2, when it attempts to unlock the list, will notice T1 and place T1 in the proper location in the list. In this way the entry list serves both as a list of threads waiting to enter the monitor, and as the OTY deferred/delegated action queue.

In this configuration, the enqueue and the dequeue operations are both lock-free. At worst, a dequeueing thread may be preempted while holding exclusive access to the entry list. Subsequent enqueuing threads can still prepend themselves, avoiding the double context switch that would be encountered if the entry list was protected with a mutex (the first context switch arises from contending for the mutex and the 2nd occurs when the thread parks itself).

Figure 5:
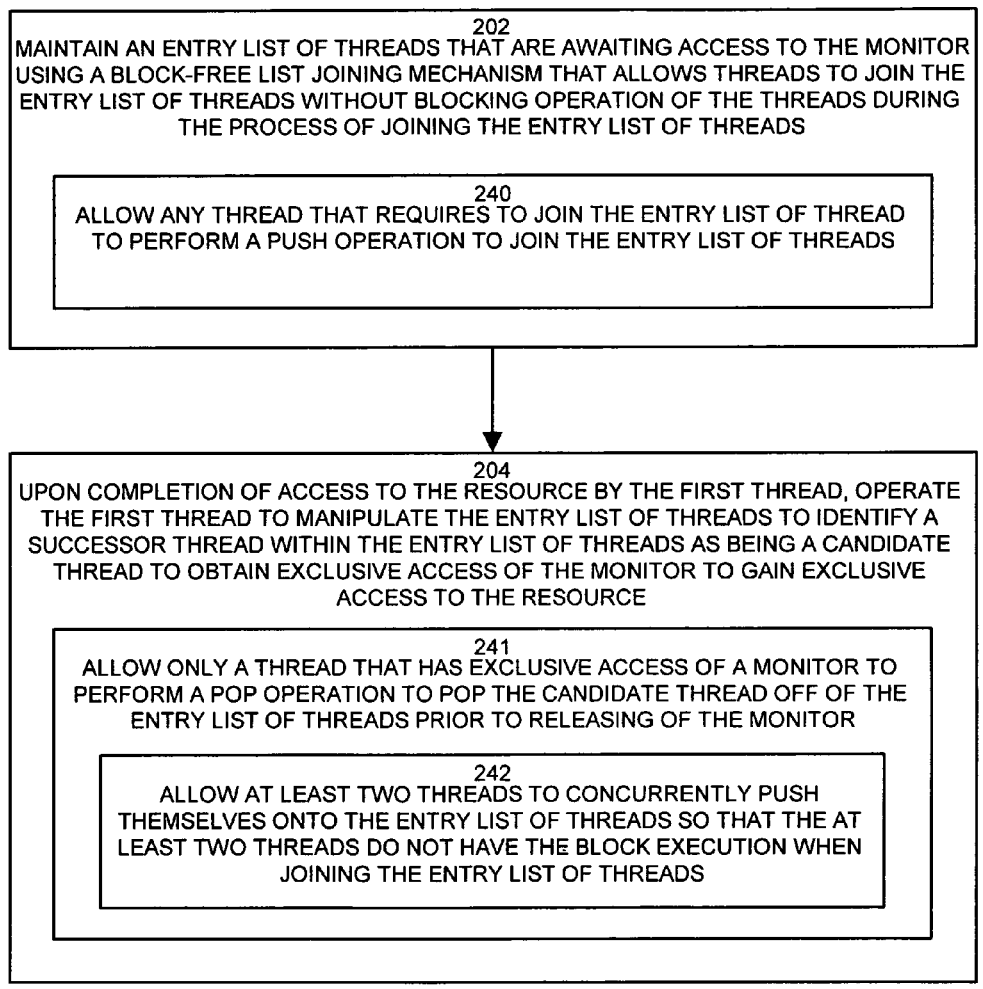
FIG. 5 is a flow chart of processing steps for maintaining an entry list of threads that are awaiting access to the monitor using a push pop list joining mechanism in accordance with one example embodiment of the invention.
Figure 6:
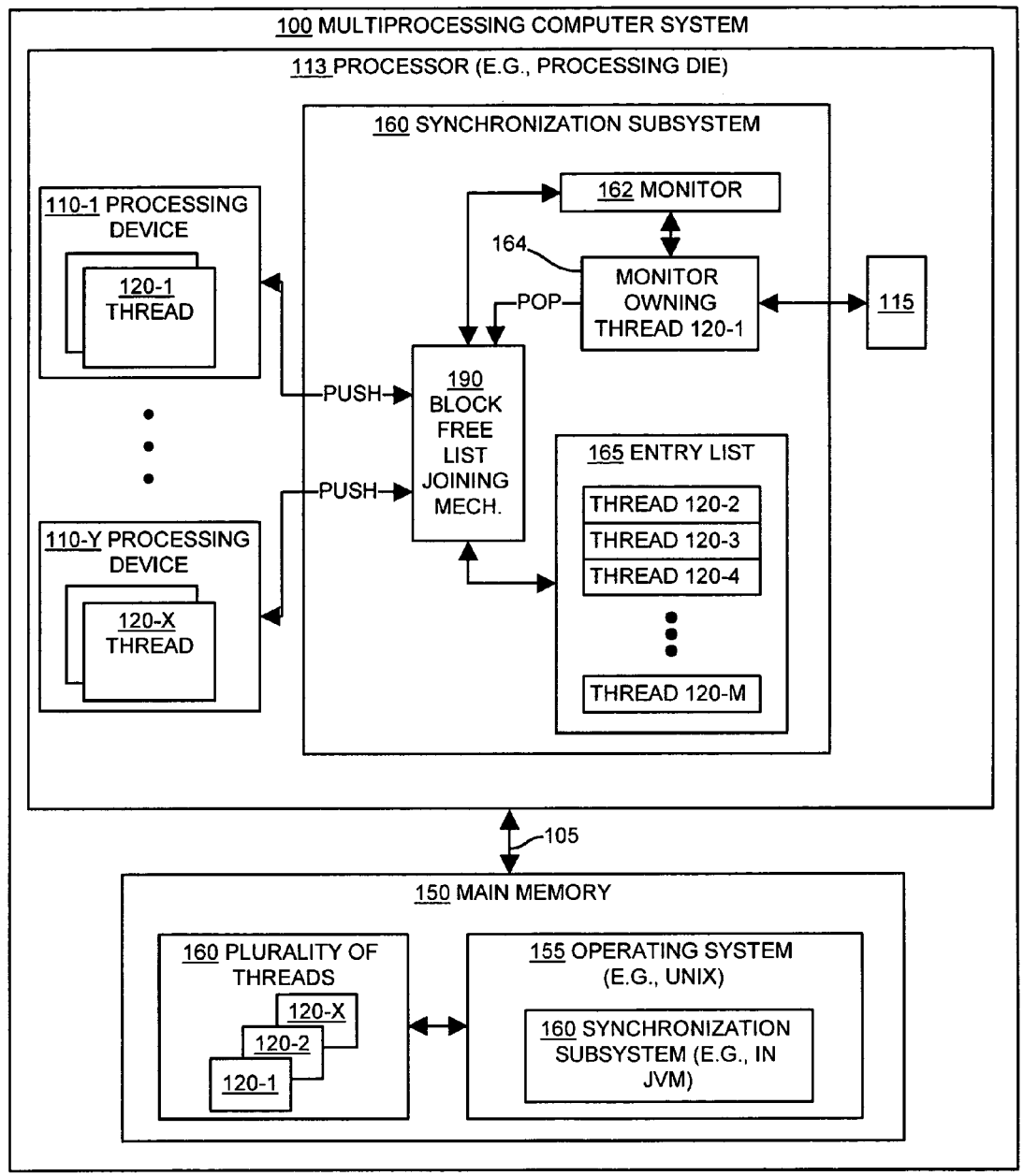
FIG. 6 is an architecture that supports the push pop processing in accordance with the processing steps shown in FIG. 5.

FIGS. 5 and 6 illustrate a push/pop configuration that the synchronization subsystem uses manage the entry list 165. Generally, in the push pop configuration, any thread 120 can push itself onto the entry list whereas only the thread that has completed ownership of the monitor 162 is allowed to perform a pop operation to pop a candidate successor thread from the entry list 165. The push and pop operations are implemented with atomic instructions such as CAS or cmpxchg.

An important concept of the push/pop embodiment is that CAS-based push-pop operations implementing a singly-linked list are vulnerable to an after-before-after (ABA) problem. This problem is described in detail in "ABA Prevention Using Single Word Instructions, IBM Research Report RC23089", published in January 2004. The entire contents of which is hereby incorporated by reference, and can be found at the URL:
Http://www.research.ibm.com/people/m/michael/RC23089.pdf Push and pop operators work properly if there is not interleaving of execution. However, concurrent push-pop operations can result in the ABA problem as shown in the following example. For this example, suppose there are concurrently operable push and pop operations implemented as follows:

```
pushThread (List * L, Thread * T)
for (;;) {
    Thread * head;
    T->Next=head=L->EntryQueue;
    if (CAS (&L->EntryQueue, L, T)==L) {
        return;
    }
    // Interference—simply retry the operation
}
popThread (List * L)
for (;;) {
    Thread * head;
    Thread * penult;
    head=L->EntryQueue;
    if (head==NULL) return NULL;
    penult=head->Next;
    // Location #1
    if (CAS (&L->EntryQueue, head, penult)==head) {
        return head;
    }
    // Interference—retry the operation
}
```

Using these operations, the following example illustrates the ABA problem:
1. Suppose that the Entry List is initially {A->B->C}
2. Thread U attempts to pop( ) from the list.
    U runs popThread( ) above, and observes A as "head" and B as "penult".
    U then stalls or is preempted at Location #1, above.
3. Thread X pops A
4. Thread Y pops B
5. Thread D pushes D
6. Thread A pushes A. The EntryQueue is now {A->D-C}
7. Thread U resumes and the CAS completes successfully, installing {B} as the head of the list. B is now present on the list when it shouldn't be, and D is not on the EntryQueue, while it should be. The list is now corrupt and has suffered from the ABA problem.

As shown above, ABA can result in list corruption. Since embodiments of the invention permit concurrent multiple enqueue (push) operations and at most one concurrent dequeue (pop) operation, that are immune to ABA. By restricting to at-most-one-popping thread at a time by establishing the convention that only the holder of the list available indicator 166 (i.e., the outer lock on the monitor) can pop.

Specifically, FIG. 5 is a flow chart of processing steps that teach details of maintaining an entry list of threads that are awaiting access to the monitor using a push pop block-free list joining mechanism in accordance with one example embodiment of the invention to provide block-free list management. FIG. 6 shows the push pop architecture and will be referenced during the discussion of the processing steps in FIG. 5.

As discussed above, in step 202, the synchronization subsystem 160 maintains an entry list of threads 165 that are awaiting access to the monitor 162 using a block-free list joining mechanism 190 that allows threads to join the entry list of threads without blocking operation of the threads during the process of joining the entry list of threads.

In step 240, the synchronization subsystem 160 allows any thread that requires the ability to join the entry list of threads 165 to perform a push operation 191 to join the entry list of threads. CAS-based pushes are lock-free and they can always proceed, even if other push or pop operations in-progress stall or are preempted.

As shown in sub-step 241, the synchronization subsystem 160 allows at least two threads 120-2 . . . 120-X to concurrently push themselves onto the entry list of threads 165 using a compare and swap operation so that the at least two threads 120 do not have to block execution for any meaningful amount of time when joining the entry list of threads 165. The push operation is implemented with atomic instructions such as CAS or cmpxchg.

As discussed above, in step 204, the synchronization subsystem 160 operates the first thread 120-1 to manipulate the entry list of threads 165 to identify a successor thread within the entry list of threads as being a candidate to obtain exclusive access of the monitor to gain exclusive access to the resource. In the push/pop configuration, this operation includes step 241 and 242 in which only the first thread that is releasing the monitor is able to perform the pop operation as shown in sub-steps 241 and 242.

In step 242, the synchronization subsystem 160 allows only a thread (e.g., 120-1) that has exclusive access of a monitor 162 to perform a pop operation to pop the candidate thread off of the entry list of threads prior to releasing of the monitor 162.

In this manner, no thread 120 awaiting access to the entry list 165 will be blocked but only the monitor owning thread 120-1 will perform successor selection via a pop to avoid contention.

Figure 7:
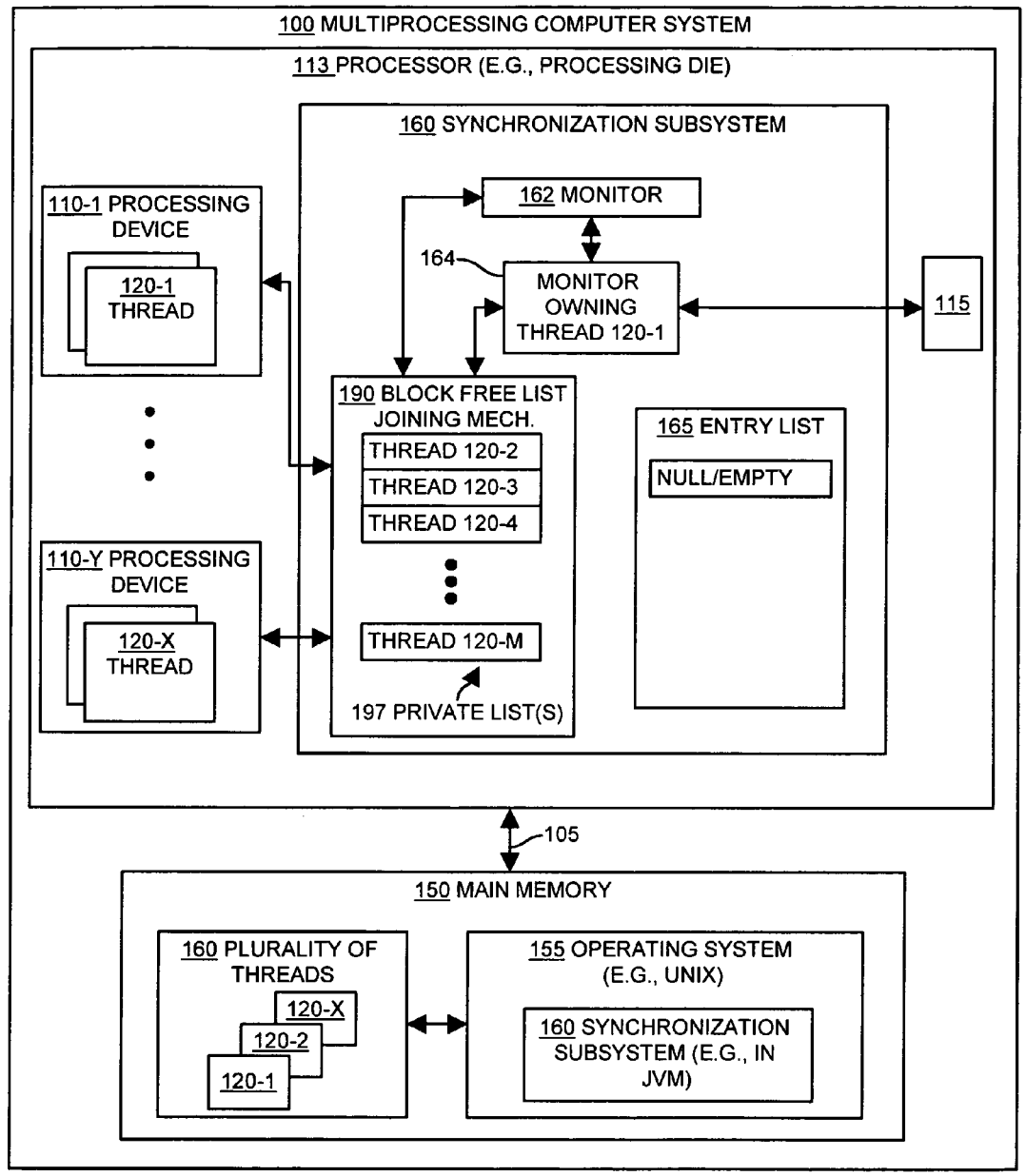
FIG. 7 is an architecture that supports detach, modify and reattach processing in accordance with the processing steps shown in FIGS. 8 and 9.

FIG. 7 shows an alternative configuration to perform entry list management referred to as detach, modify, reattach or DMR. As shown in FIG. 7, using the DMR technique, threads 120 that need to join the entry list 165 are able to detach the entry list 165 from its starting location to create a private list 197 this is an exact copy of the entry list 165 at the time of detachment. The thread (e.g., 120-P) that detaches can then add itself to the private detached list 197 (i.e., modify the list 197 to place themselves in the private list). The detach and reattach operation are accomplished atomically, for example with CAS. While detached, the detach point causes the entry list 165 to appear as being empty or null to other threads 120 that need to add themselves to the entry list 165. When the addition of the thread to the private list is complete, the thread that detached the entry list can reattach it back to the starting point of the main non-private entry list 165. However, upon beginning the reattachment operation, if the reattaching thread "sees" that the entry list 165 starting point is no longer empty or null, that means one or more other thread(s) have arrived (i.e. while the first thread was performing its own DMR on its private list 197) and have added themselves to the entry list 165 (using its own DMR processing). In such a case, the reattaching thread can detach the new non-empty entry list 165 to create a second private list and can perform a merge with the first and second private lists to form a single private list 197 that is then reattached as the entry list 165. Again, upon reattachment, if the non-private entry list 165 is not empty, the process is repeated (detach, merge and reattached) until the reattachment can be performed to an empty entry list stating point 165.

Figure 8:
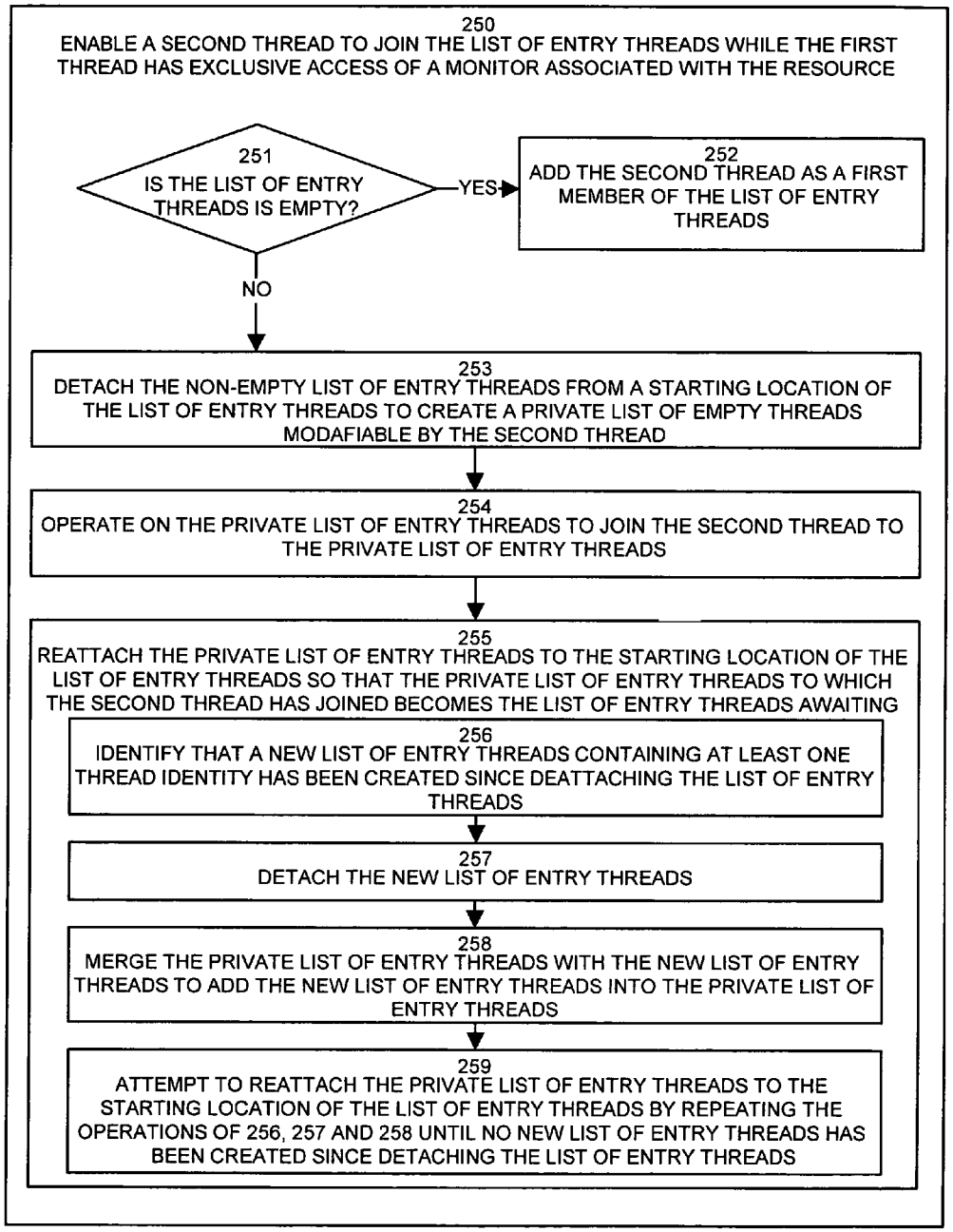
FIGS. 8 and 9 are flow charts of processing steps for maintaining an entry list of threads that are awaiting access to the monitor using a detach, modify, reattach list joining mechanism in accordance with one example embodiment of the invention.

FIG. 8 is a flow chart of processing steps that teach details of maintaining an entry list of threads that are awaiting access to the monitor using a block-free list joining mechanism in accordance with one example embodiment of the invention that uses the detach, modify, reattach configuration of FIG. 7 to provide lock-free list management. Reference is made to the illustration in FIG. 7 showing an example detach, modify, reattach configuration in accordance with an example embodiment. In step 250, the synchronization subsystem 160 enables a second thread 120-2 to join the list of entry threads while the first thread 120-1 has exclusive access of a monitor 162 associated with the resource 115. Step 251 through 259 detail the operations in accordance with the detach, modify, reattach (DMR) configuration.

In step 251, the synchronization subsystem 160 determines if the list of entry threads 165 is empty.

In step 252, if the list of entry threads 165 is empty the synchronization subsystem 160 adds the second thread 120-2 as a first member of the list of entry threads (e.g., using the DMR technique explained here).

If the list of entry threads is not empty in step 251, the synchronization subsystem 160 performs the operations of steps 253 through 259.

In step 253, the synchronization subsystem 160 detaches the non-empty list 165 of entry threads from a starting location of the list of entry threads to create a private list of empty threads 197 modifiable by the second thread 120-2.

In step 254, the synchronization subsystem 160 operates on the private list of entry threads 197 to join the second thread 120-2 to the private list of entry threads 197.

In step 255, the synchronization subsystem 160 reattaches the private list of entry threads 197 to the starting location of the list of entry threads 165 so that the private list of entry threads 197 to which the second thread has joined becomes the list of entry threads 165 awaiting access to the monitor. If in step 255 the entry list 165 is not empty upon reattachment, sub-steps 256 through 259 are repeated until the reattachment operation in step 259 finds an empty entry list 165.

In step 256, the synchronization subsystem 160 identifies that a new list of entry threads 165 containing at least one thread identity has been created since deattaching the list of entry threads (in step 253).

In step 257, the synchronization subsystem 160 detaches the new list of entry threads 165 (i.e., to create a second private list).

In step 258, the synchronization subsystem 160 merges the private list of entry threads 197 with the new list of entry threads (i.e., the detached second private list) to add the new list of entry threads into the private list of entry threads 197;

In step 259, the synchronization subsystem 160 attempts to reattach the private list of entry threads 197 to the starting location of the list of entry threads by repeating the operations of steps 256 through 258 until no new list of entry threads 165 has been created since detaching the list of entry threads in step 257. In this way, threads can join the entry list using their own private list and do not have to block. Any thread that returns the private list during the reattach operation and discovers a non-empty entry list can detach that list and merge it with its private list. This is repeated until the entry list is discovered to be empty and the private list 197 is then reattached as the entry list 165.

Figure 9:
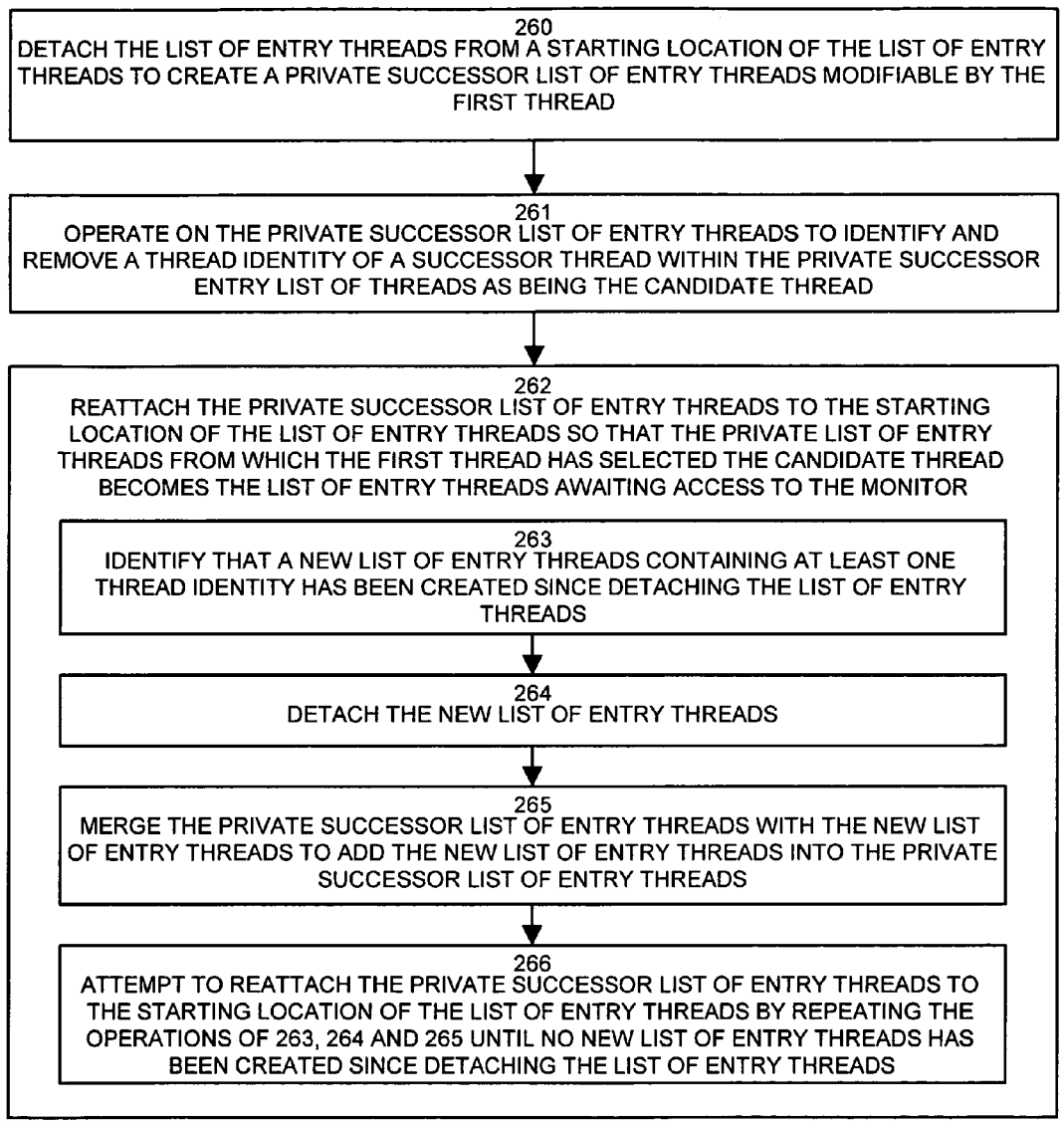

FIG. 9 is a flow chart of processing steps that teach details of operating the first thread 120-1 (that owns the monitor) to manipulate the entry list of threads 165 to identify a successor thread within the entry list of threads as being a candidate thread to obtain exclusive access of the monitor 162 in accordance with one example embodiment of the invention that uses a detach, modify, reattach configuration to provide lock-free list management. Reference is again made to the illustration in FIG. 7 during discussion of processing.

In step 260, the synchronization subsystem 160 detaches the list of entry threads from a starting location of the list of entry threads to create a private successor list of entry threads 198 modifiable by the first thread 120-1.

In step 261, the synchronization subsystem 160 operates on the private successor list of entry threads 198 to identify and remove a thread identity of a successor thread within the private successor entry list of threads 198 as being the candidate thread (i.e., as being a candidate to be selected for monitor ownership).

In step 262, the synchronization subsystem 160 reattaches the private successor list of entry threads 198 to the starting location of the list of entry threads so that the private list of entry threads 198 from which the first thread has selected the candidate thread becomes the list of entry threads 165 awaiting access to the monitor. If in step 262 the entry list 165 is not empty upon reattachment, sub-steps 263 through 266 are repeated until the reattachment operation in step 266 finds an empty entry list 165.

In step 263, the synchronization subsystem 160 identifies that a new list of entry threads 165 contains at least one thread identity that has been created since detaching the list of entry threads in step 260.

In step 264, the synchronization subsystem 160 detaches the new list of entry threads 165.

In step 265, the synchronization subsystem 160 merges the private successor list of entry threads 198 with the detached new list of entry threads to add the new list of entry threads into the private successor list of entry threads 198.

In step 266, the synchronization subsystem 160 attempts to reattach the private successor list of entry threads to the starting location of the list of entry threads by repeating the operations of steps 263 through 265 until no new list of entry threads has been created since detaching the list of entry threads.

In this manner, the DMR technique allows block-free entry list management for access to a shared resource. Other systems that use synchronization constructs such as POSIX pthreads mutexes [LB96][POS94][SOLMT] and Solaris kernel mutexes and turnstiles [SOL01] also incorporate lists of blocked threads. The techniques described herein may be applied to those constructs as well.

Embodiments of the invention can thus operate to control access to the resource without requiring thread blocking. It is to be understood that the processing described herein may be performed by separate processes or programs as a collective set of operations. As an example, the sequence of operation in the flow charts above may be performed by threads in conjunction with the synchronization subsystem. Such variations are intended to be covered by the scope of this invention. As such, the foregoing description of embodiments of the invention are not intended to be the limiting.

Several variations on the aforementioned configurations are possible and some details of such variations will now be presented. Separate figures for each are not shown as the illustrations in FIGS. 1, 4, 6 and 7 already described will suffice for a description of these alternate configurations, though their components might vary slightly from those shown in those figures.

In one variation of the aforementioned embodiment discussed with respect to FIGS. 3 and 4, the monitor 162 and list access indicator 166 are the same data structure, such as a word in memory. The monitor 162 is thus a "queue word" containing an "exclusive access bit" (X-bit) 176 and a pointer 177 to the head of the entry list 165. Other embodiments encode an "outer lock" bit (L-bit) in that same queue word 162. That is, the outer lock indication for control of the resource 115 may, variously, be co-located in the queue word 162 along with the but used to represent the list available indicator 166, or it may reside in a separate monitor word.

In operation of one variation of the embodiment shown in FIG. 4, threads enqueue themselves on the entry list 165 by way of a CAS-based "push" operation. The "push" prepends the thread onto the entry list 165. The CAS-based push is extremely simple—the thread 120 simply fetches the monitor queue word 162, stores that queue word value in the thread's "next" field 178, and then attempts to use CAS to swing the queue word 162 from the previously fetched value to the address of the pushing thread. If the CAS fails the thread 120 simply retries the "push" operation. In this way an entering thread 120 pushes itself onto the front of a list 165 identified by the queue word. Entering threads never change the X-bit 176 value in the queue word 162. Critically, a push can be accomplished without the need to acquire the X-bit. Locking (contending) threads simply prepend themselves onto the entry list 165 and then park.

Exiting threads release the outer lock 176 on the resource 115 and during this process, select and dequeue a successor thread 120 from the entry list 165, and then unpark that successor. Note that the operations don't necessarily need to be performed in that particular order, and some operations might be performed in a compound fashion with CAS. The X-bit 176 serves as a "lock", which indicates that a dequeue is in-progress. Only one thread may set or "own" the X-bit 176 at any given time. Furthermore, only exiting threads 120 set the X-bit 176. Once set by an exiting thread, the X-bit 176 protects against (prevents) other concurrent dequeue operations, so with respect to the dequeueing thread, the only possible source of concurrency and interference will be "push" enqueue operations performed by entering threads. Any thread can push (enqueue) but only thread that set the X-bit 176 can dequeue or otherwise mutate the entry list 165. To dequeue a successor an exiting thread first attempts to set the X-bit with CAS. If an unlocking thread 120-1 finds that the X-bit 176 is already set then that unlocking thread can simply return without dequeuing and waking a successor. Because the X-bit 176 is set, another thread must be in the midst of dequeueing a successor thread. There is no need for yet another successor as one is sufficient to ensure the required liveness and progress properties for the monitor 162. If an exiting thread observes that the X-bit is clear 176, it attempts to detach the list 165 to form a private list with CAS, leaving the X-bit 176 set and all the remaining queue word bits 177 NULL. The exiting thread then, optionally, repairs the list order applying whatever queue discipline is chosen to the recently arrived threads, possibly merging the recently arrived threads found at the front of the list into the stable list segment at that tail. Next, the exiting thread selects and dequeues a successor thread from the list 165. After dequeueing a successor, the unlocking thread then attempts to reattach the private list 167 to the entry list 165 and clear the X-bit 176 with a single CAS. More precisely, the exiting thread employs CAS to attempt to change the queue word 166/162 from (Head=NULL:X=1) to (Head=List:X=0). If more threads 120 have arrived (enqueued) in the interim into the entry list 165, the CAS will fail and the unlocking thread will detach that segment as a private list 167 and re-merge, repeating as necessary.

By way of example, if a thread T1 attempts to enqueue itself while the entry list queue 165 is locked by some exiting thread T2, T1 simply pushes its identity onto the front of the entry list 165, delegating the responsibility for *properly* enqueueing T1 to T2 (when it exits). T2, when it attempts to clear the X-bit 176, will notice T1 and place T1 in the proper location in the entry list 165. In this way the list available indicator 166 provides a queue word that serves both as an identifier of a queue of threads waiting to enter the monitor 162 for access to the resource 115, and as an deferred/delegated action queue. In this configuration, at any given time the entry list 115 is a queue that consists of a prefix segment of zero or more recently arrived threads (shown as a chain list 167 in FIG. 4), followed by the sorted body of the list 165. Because it is constructed with a CAS-based push, the prefix always takes the form of a singly-linked list. The sorted body of the list 165 could be organized as a singly-linked list, a circular doubly-linked list, or some more elaborate list organization.

The aforementioned alternate configuration is distinguished by using a CAS-based push at enqueue time, and a modified version of the Oyama [see the OTY reference] technique at deqeueue-time.

Another configuration provides an "enhanced" configuration that uses Modified-Oyama at both enqueue-time and dequeue-time. In this enhanced configuration, a monitor holds a separate entry list word (which points to the head of the entry list), and a contention-word. These are not shown specifically in FIG. 4, though 162, 166 and 176, 177 can be used to represent such data structures. The contention-word 166 contains an L-bit (outer lock indicator) 176, an X-bit 177 and a pointer to the head of a simple singly-linked chain list 167 of recently arrived threads. The list 167 is ordered by arrival time, with the most recently arrived threads 120 nearest the head of the list. The chain list of recently arrived threads 167 consists of threads whose enqueue operation was deferred because the X-bit 177 was held by some other thread—and this configuration could just as refer to the "recently arrived thread list" as the "deferred enqueue list" 167. In this variation the entry list word is never accessed with atomics (CAS), so the organization of the entry list 165 and the word (or words) that describe the list are not restricted by the need to encode a list designator in a single word. As a notational convenience, the notation (List=T5:L=1:X=0) can be used as an example to describe a contention-word encoded with the recently arrived thread list anchored at T5, the L-bit set to 1, and the X-bit set to 0.

Enqueueing in Alternate Configurations:

To perform the enqueue operation for a thread to enqueue itself, a thread first reads the contention-word. If the L-bit is clear, the thread uses CAS to attempt to swing the L-bit in the contention-word from 0 to 1. If successful, the thread owns the outer-lock—it abandons the enqueue attempt and allows control to pass into the critical section protected by the monitor. If the CAS fails, the thread retries the enqueue operation. Otherwise, if the L-bit is set, the enqueuing thread T2 examines the X-bit in the fetched contention-word value.

Upon an enqueue attempt, if the X-bit is set, then some other thread currently has exclusive access to the entry list. In this case the entering thread uses CAS to try to "push" itself (prepend itself) onto the list of recently arrived threads anchored by the contention-word. In detail, the thread stores the previously-fetched contention-word value in it's "next" field and then attempts to CAS its own address or-ed with the L-bit and X-bit from the previously fetched contention-word value, into the contention-word. (Of special note, if the X-bit is set and thread pushes itself, it propagates the existing X-bit and L-bit into the new contention-word value). If successful, the thread has entered itself onto the list of recently arrived threads, and may then park itself. If the CAS fails, then the contention-word has changed, so the thread retries the enqueue operation. (That is, it starts by re-reading the contention-word and repeats as necessary).

Upon an enqueue attempt, if the X-bit is clear, the enqueueing threads uses CAS to try to change the X-bit in the contention-word from 0 to 1. By convention, if the X-bit is clear, then the recently arrived list subfield in the contention-word must also be NULL. The algorithm does not strictly require this constraint, but it makes design slightly more simple. If the CAS fails, the thread simply retries the entire enqueue operation. (Critically, this isn't futile spinning—if the CAS fails then some other thread changed the contention-word, which implies that the other thread made progress in the interval between the load and the CAS. As such, the configuration and method are lock-free. This argument applies to all the other cases in the algorithm where the configuration attempts a CAS and then, if the CAS fails, recycle and retry the operation). If this CAS succeeds, the enqueueing thread T2 has exclusive access to the entry list and may enqueue itself without risk of concurrent interference from other threads.

After enqueueing itself the thread will attempt to clear the X-bit with CAS. This phase is referred to herein as the "restoration operation". During the restoration operation, a number of possible case arise:

A. In the normal case, with no concurrent operations have changed the contention-word, the L-bit in the contention-word remains set, and no threads have enqueued themselves on the recently arrived list, so the contention-word contains the same value that T2 recently stored into it with CAS (that is, the same value T2 stored into the contention word with CAS when it originally set the X-bit at the top of step 2). Specifically, the contention-word will be (List=NULL:L=1:X=1). Since the contention-word value is unchanged, the CAS to clear the X-bit in the contention word is successful, and T2 may then park itself Specifically, T2 CASes the contention-word from (List=Null:L=1:X=1) to (List=Null:L=1:X=0).

B. If more entering threads T3 and T4 arrived while the enqueuing thread T2 held exclusive access and those threads enqueued themselves on the deferred enqueue list formed by the contention-word, the CAS used to clear the X-bit will fail and the thread T2 attempting to clear the X-bit will notice the list of newly arrived threads in the contention-word. In other words, T2 attempts to CAS the contention-word from (List=Null:L=1:X=1) to (List=Null:L=1:X=0), but the CAS fails because the contention word word currently contains (List=T4:L=1:X=1). In this case T2 uses CAS to "break off" or detach the singly linked list of recently arrived threads (T3 and T4 in this example), but continues to propagate the L-bit and X-bit values currently in the contention-word. In detail, T2 uses CAS to try to swing the contention word from (List=T4:L=1:X=1) to (List=NULL:L=1:X=1). Once T2 successfully detaches the list of recently arrived threads it then transfers or enqueues those threads onto the properly-sorted entry list. (Recall that T2 still has exclusive access to the entry list). T2 then restarts the restoration operation.

C. While T2 held exclusive access, the lock owner T1 may have released the lock and cleared the L-bit in the contention-word. At the start of the restoration phase T2 will notice that the L-bit is clear. In this case T2 dequeues itself from the entry list (in anticipation of immediately acquiring the lock), and then uses a single CAS to try to (a) swing the L-bit to 1, and (b) clear the X-bit. If the CAS is successful, T2 holds the lock and can proceed into the critical section. If the CAS fails, T2 retries (reruns) the restoration operation. Alternately, if T2 observes the L-bit clear it could try to CAS the L-bit to 1, but keep the X-bit set. If the CAS failed, T2 would retry the restoration operation. If the CAS succeeded then T2 holds the outer lock. T2 then must dequeue itself from the entry list. Next, T2 would attempt to clear the X-bit. If the contention-word indicated the presence of recently arrived threads, T2 would loop, detaching those threads and transferring them to the entry list. Finally, when no recently arrived threads were discovered, T2 would clear the X-bit but leave the L-bit set to 1. T2 holds the outer lock—it could then proceed into the critical section.

D. Conditions (b) and (c) could arise at the same time. T2 could observe a contention-word of the form (List=T4: L=0:X=1). In other words T2 might notice newly arrived threads _and_ that the outer lock had been released. In this situation T2 would use CAS to detach the list, as described above in (b), and transfer the recently arrived threads to the entry list. At this point the contention-word would be of the form (List=Null:L=0:X=1). T2 could then retry the restoration phase, in anticipation of encountering condition (c).

Dequeueing in Alternate Configurations:

An exiting thread T1 that needs to extract a successor from the entry list will fetch the contention word and examine the X-bit. For the purposes of brevity, we'll assume that the exiting thread has already cleared the L-bit, releasing the outer-lock, before it attempts to dequeue a successor. In practice, various implementations might merge the operations below with the CAS that clears the L-bit.

1. If clear, the exiting thread attempts to CAS the contention from (List=Null:L=*:X=0) to (List=Null:L=*: X=1) to set the X-bit and acquire exclusive access to the entry list. Note that the L-bit may be 0 or 1—another thread may have acquired the lock since T1 released it. If the CAS fails, the thread re-reads the contention-word and retries the dequeue operation. The CAS might fail because the L-bit changes or the X-bit is set by some other thread. If the CAS succeeds, the thread has exclusive access to the entry list and can safely dequeue from the entry list without risk of interference from other threads. (At most one thread, of course, can have exclusive access to the entry list at any one time). Once T1 has dequeued a successor it attempts to clear the X-bit, using CAS to try to "swing" the contention-word from (List=Null:L=x:X=1) to (List=Null:L=-x:X=0). If the algorithm has not yet cleared the L-bit, it can also clear the L-bit using the same CAS that clears the X-bit. If the CAS fails then other locking threads must have pushed themselves onto the deferred enqueue list. In this case T2 uses CAS to install (List=Null:L=x:X=1) into the contention-word, detaching the deferred enqueue list. T1 then transfers the contents of the deferred enqueue list to the entry list, sorting and positioning the threads as required by the prevailing queue discipline. T1 then re-attempts clear the X-bit. Of course yet more threads may have arrived, in which case T1 must loop and continue to transfer those threads to the entry list until the time T1 discovers the recently arrived list is empty (Null).

2. Critically, if T1 observes that the X-bit is set then T1 can abandon the attempt to extract and unpark a successor. No further action is required of the exiting thread to ensure liveness and succession. Some other thread, say T8, has exclusive access to the entry list and is either in the act of enqueueing itself of dequeueing a successor.
   a. If the exclusive-access holder T8 is an exiting thread then it is dequeueing some successor. T1 is guaranteed that a successor will subsequently be made ready by T8.
   b. If the exclusive-access holder T8 is an entering thread, then it is attempting to enqueue itself. In this case, since T1 has already cleared the L-bit in the contention word, T8 will later observe that the L-bit is clear and will attempt to acquire the outer lock.

Other useful variants exit as well. In the DMR forms, a CAS-based push is used at enqueue-time and DMR at dequeue-time (this configuration is thus push-DMR). Alternately, DMR may be used at both enqueue-time and DMR at dequeue-time (DMR-DMR). In push-Modified-Oyama and push-DMR, the dequeue operator is responsible for sorting the newly arrived threads into the entry list. In Modified-Oyama—Modified-Oyama and DMR-DMR the enqueue operator is typically responsible for ordering the entry list. Hybrid forms may be implemented as well. For example to implement a mostly-prepend queue discipline, a configuration uses push-pop for most operations, but for every Nth thread, switch to push-DMR or push-Modified-Oyama. It is to be understood that embodiments of the invention are intended to include all of these example configurations and equivalents thereto.

APPENDIX

The following provides examples of embodiments of the invention:

The Java Virtual Machine (JVM) provides Java monitors [JVM97] by which threads running application code may participate in a mutual exclusion protocol. A monitor is either locked or unlocked, and only one thread may own the monitor at any one time. Only after acquiring ownership of a monitor may a thread enter the critical section (synchronized block) protected by the monitor. If a thread attempts to lock a monitor and the monitor is in an unlocked state, the thread will immediately gain ownership of the monitor. If a subsequent thread attempts to gain ownership of the monitor while the monitor is locked, that thread will not be permitted to proceed into the critical section until the owner releases the lock and the 2nd thread manages to gain (or is granted) exclusive ownership of the lock.

(Regarding terminology: critical sections are referred toss "synchronized blocks" in Java. To "enter" a monitor means to acquire exclusive ownership of the monitor and enter the associated critical section. Likewise, to "exit" a monitor means to release ownership of the monitor and exit the critical section. We also say that a thread that has locked a monitor now "owns" that monitor).

Typically, a monitor object contains an owner field, which identifies the thread that owns the monitor, and queue of blocked threads. When the owner field is NULL the monitor is unowned. Commonly, a thread attempts to gain ownership of a monitor by using an atomic instruction such as CAS (compare-and-swap on SPARC, or cmpxchg on Intel's IA32 processor) to atomically replace a NULL value in the owner field with its own non-NULL thread identifier value. If the CAS succeeds the thread is said to own or hold the monitor. If the CAS fails—because the monitor is owned by some other thread and the owner field was non-NULL—the acquiring thread is not permitted to enter the critical section. In this case the acquiring spins or blocks itself in order to give other threads an opportunity to run.

1. spin

The acquiring thread loops, periodically loading the owner field, waiting for the thread that owns the lock to release the lock. If the spinning thread loads a NULL value it will then attempt a CAS to try to gain ownership of the lock. If the CAS succeeds the thread is permitted to enter the critical section, otherwise the thread continues spinning. The spinning thread consumes processor cycles that might have otherwise been used to perform useful work by other threads. Spinning is sometimes referred to as "busy waiting". Pure spinning doesn't scale well and wastes resources, so we won't discuss it further.

2. block

The acquiring thread blocks itself. A lock owner will eventually release the lock and wake the blocked thread, permitting previously blocked thread to become runnable and again compete for ownership of the lock. When a thread is blocked it is not eligible to be dispatched onto a processor by the operating system's scheduler. Waking a thread makes it again eligible to be dispatched onto a processor. (Typically, waking a thread moves the thread onto the scheduler's so-called "ready queue" and we say the thread is runnable). When a thread blocks itself the scheduler picks some other ready thread from the ready queue and dispatches that thread. If no ready threads are available the processor becomes idle. Blocking a thread results in a context-switch.

Hybrid "spin-block" or (spin-then-block) implementations that spin for some period and then revert to blocking are described in the literature. The synchronization subsystems in various Java Virtual Machine implementations use blocking or spin-then-block [STB] strategies.

A thread that attempts to lock an already-locked monitor will add itself to a monitor-specific "entry queue" and then block itself. (The term "entry queue" or "entry list" arises from the fact that the threads on the entry queue are queued waiting to enter a critical section protected by the monitor). The entry queue is a list of blocked threads that are waiting to acquire the monitor. Blocked threads are ineligible to run and will not be picked to execute by the operating system's short-term scheduler. Blocked threads do not consume any processor cycles. When the thread that owns the monitor eventually releases the lock it will pick a thread (sometimes called the "heir presumptive" or a "potential successor" from the entry queue and make that thread ready. The successor will eventually be dispatched onto a processor by the operating system's scheduler—the thread then recompetes for ownership of the monitor and will either acquire ownership of the monitor (and be permitted to proceed into the critical section) or, if it fails to acquire ownership, it will again block.

Operating systems provide routines that allow a thread to block itself and for another thread to subsequently wake a blocked thread. When a thread blocks itself the kernel scheduler immediately picks another ready thread to run on the processor where the blocking thread previously ran. Threads that are not blocked are either running or ready. A ready thread is not running, but is on the operating system's ready queue and is eligible to run. Waking a blocked thread makes that thread ready. Note that on Solaris the primitive used by a thread to block itself is called "park" [SOL01][SOLMT], the primitive to wake a blocked thread is called "unpark". blocked threads are referred to as "parked", and ready threads are referred to as "runnable". Typically, the short-term scheduler manages all the transitions between ready and running. The synchronization subsystem in the JVM presides over all transitions from ready to blocked (when a contending thread blocks itself) and from blocked to ready (when a thread releasing a lock wakes a successor).

Other synchronization constructs such as POSIX pthreads mutexes [LB96][POS94][SOLMT] and Solaris kernel mutexes and turnstiles [SOL01] also incorporate lists of blocked threads. The techniques we describe below may be applied to those constructs.

The entry queue itself must be maintained correctly in the face of concurrent enqueue and dequeue operations. Enqueue and dequeue operations must avoid races (inopportune interleavings) that might corrupt the list. To guarantee safe updates of the list mutual exclusion mechanisms such as spin locks, spin-yield locking, or low-level mutual exclusion primitives are typically used to protect the list. (The lock that protects a monitor's entry list is commonly called the "inner lock" or "meta lock" [AGE99], and the monitor itself is called the "outer lock"). Methods that employ mutual exclusion are exposed to such undesirable effects as convoying [FRA03], priority inversion, deadlock, unduly impeded execution, and restricted parallelism. When contention (concurrency) on the entry queue is minimal, both lock-free mechanisms and mutual exclusion provide approximately equal performance. As contention increases, however, lock-free techniques tend to perform much better than mutual exclusion.

Ideally, an entry queue mechanism should be able to efficiently support a number of queue disciplines (queue ordering policies), such as LIFO, FIFO, and mostly LIFO.

We now describe a novel family of lock-free techniques [FRA03][HER91][GRE99][VAL95] to safely operate on the entry queue in a concurrent environment.

Solution—Lock-free lock queues for monitor entry queues.

At first it might seem counter-intuitive to use lock-free lock queues, in the implementation of locks, but in circumstances where we use a per-monitor mutex or spinlock to protect the queue we have measured high levels of contention on that mutex. Under high load, a thread may block acquiring the mutex, and then block again while it waits to acquire the monitor. In other words, the thread might encounter contention on the outer lock, and then the inner lock. Such double context switching is costly, degrades performance, pollutes the processor caches, and serves no useful purpose.

A synchronization mechanism is lock-free if a system is guaranteed to make "useful" forward progress in a finite number of steps. By "steps" we mean processor cycles. The word "system" is also slightly subtle. A system is composed of a group of threads. Lock-freedom doesn't guarantee that a specific thread is guaranteed to make progress in a finite # of steps, but rather that at least one of the threads in the system is guaranteed to make progress after the group of threads take as a whole has completed a finite # of steps.

A program that uses locks, mutexes, or monitors or other mutual exclusion primitives isn't lock free, as the lock-holder might be preempted, suspended, interrupted, take a page fault or otherwise stall. Other threads attempting to enter the critical section and "make progress" are impeded by the stalled lock-holder. Threads that use spin-locks are also not lock-free, even though the thread might not block. Spin-locks don't block (park), so you might argue correctly that they're "block-free", but they're not lock-free. (A spin lock could spin indefinitely if the lock owner was preempted or stalled, thus violating the "finite steps" constraint). Using lock-free is more precise, and a stronger statement, as we're asserting that our threads when performing the entry list enqueue or dequeue operations neither block nor spin futilely.

Lock-free systems enjoy the following benefits over traditional mutual-exclusion locks:

1. Better worst-case latency.
   This is critical for real-time system.
   If the lock-holder is stalled, other threads can still make progress, which generally improves the response time of the system.
2. More efficient—less spinning and context switching.
   Another way of stating the same thing is to say that lock-free mechanisms avoid "convoys" of threads. A convoy (sometimes referred to as a "herd") is the group of threads that accumulate waiting for a lock to be released. If the lock-holder is stalled, the convoy can become quite long.
3. Avoids "priority inversion".
   Lets say thread T1, which is a low-priority thread acquires lock L. Then, because T1 operates at low-priority, the kernel deschedules (involuntary preempts or time-slices) T1 so other higher priority threads might run. The scheduler dispatches T2, a higher priority thread. T2 is given relatively more compute cycles than T1 by the scheduler. T2 tries to acquire L, but blocks because T1 holds the lock. T2 won't make progress until T1 is scheduled and gets a chance to run, finish the critical section guarded by L, and release L. Low priority threads can impede the progress of high priority threads, which works contrary to the desired scheduling policy. There are various remedies, such as having the OS transiently boost T1's priority to that of T2 while T2 is impeded by T1 (this is called the "priority ceiling protocol" or "priority inheritance protocol"), but the solutions are somewhat tricky.
   Using lock-free synchronization is a better way to avoid priority inversion.
4. No chance of deadlock. Deadlock can occur with normal mutual exclusion primitives, but lock-free mechanisms are immune to deadlock.

By switching to lock-free lock queues we eliminate the need for a mutex or spin-lock to protect the entry queue. All the enqueue and dequeue operators described below are both lock-free and concurrency-safe. Our design is such that no possible interleaving of multiple, concurrent enqueue and dequeue operations could result in corrupt entry lists.

We now describe 3 implementations:

A. Modified Oyama

The first scheme is derived from a mechanism invented by Oyama, Taura and Yonezawa. [OTY]. Briefly, in Oyama's basic scheme a "Lock" is a single word, initially NULL. The least-significant-bit (LSB) of the word is used as an exclusive access bit. To acquire the lock, a thread first fetches the lock word. If the exclusive access bit is clear, the thread attempts to set the bit with CAS. If successful, the CASing thread is the owner. More precisely, the thread that managed to CAS the LSB from 0 to 1 is the owner. If, upon reading the lock word, the bit is set, the thread instead uses CAS to try to prepend or push a special "delegated action" node onto the list, propagating the exclusive access bit as well. When the owner eventually releases the lock it first reads the lock word. If no delegated actions are queued the lockword will have the exclusive access bit set (and no other bits). In this case the owner uses CAS to attempt to install NULL into the lock word. If the CAS succeeds, the lock is released. If delegated action nodes are present on the list, however, the owner uses CAS to detach the list of delegated actions, leaving the exclusive access bit set. Having "broken off" the list, the owner then processes the deferred actions on behalf of the contending threads. Once completed, the owner again attempts to swing the Lock word to NULL, repeating the process until no deferred action requests are found. Any thread can prepend to the list, but only the owner can detach the list. In Oyama, requests that arrive while an update is in progress (by the owner) are queued. Before releasing the lock, the owner applies all queued operations on behalf of the threads that attempted to acquire the lock, failed, and instead enqueued a request.

We can specialize Oyama to monitor entry queues and make it lock-free as follows. Recall that blocking threads need to add themselves to the entry queue, and threads unlocking a monitor need to be able to remove a successor thread from the entry queue. Locking (contending) threads simply prepend themselves onto the list and then park. The thread structure serves as the "delegated action" node. The entry queue word serves as both the Oyama lock word and the head of entry queue. The LSB serves as the "Exclusive list access bit". Unlocking threads attempt to set the LSB with CAS. If an unlocking thread finds that the LSB is already set then that unlocking thread can simply return without waking a successor—because the LSB is set another thread must be in the midst of dequeueing a successor. (We don't need yet another successor; one is sufficient to guarantee the required liveness and progress properties for the monitor). If an unlocking thread observes that the entry queue LSB is clear, it attempts to detach the list with CAS, leaving the LSB set. It then repairs the list order applying whatever queue discipline we chose to the recently arrived threads, merging the recently arrived threads into the stable list segment at that tail. After dequeueing a successor, the unlocking thread then attempts to reattach the list. If more threads have arrived in the interim, the unlocking thread will detach that segment and re-merge, repeating as necessary.

At any given time the entry queue consists of a prefix segment of zero or more recently arrived threads, followed by the sorted body of the list. The prefix takes the form of a singly-linked list. If thread T1 attempts to enqueue itself while the queue is locked by some exiting thread T2, T1 simply pushes itself onto the front of the queue, delegating the responsibility for *properly enqueueing T1 to T2. T2, when it attempts to unlock the queue, will notice T1 and place T1 in the proper location in the queue. In this way the entry queue serves both as a queue of threads waiting to enter the monitor, _and_ as the OTY deferred/delegated action queue.

The enqueue and the dequeue operations are both lock-free. At worst, a dequeueing thread may be preempted while holding exclusive access to the entry queue. Subsequent enqueuing threads can still prepend themselves, avoiding the double context switch that we'd encounter if we protected the entry queue with a mutex. (the first context switch arises from contending for the mutex and the 2nd occurs when the thread parks itself).

See "appendix—OTY" for a C/Solaris implementation.

B. Push-Pop

In general, a concurrent LIFO singly-linked list managed with CAS-based push and pop operations is vulnerable to ABA corruption. See appendix-ABA for an example of the pathology. Note that an LL-SC-based implementation avoids the ABA problem, but LL-SC isn't commonly available, whereas CAS is available on such commonly used processors as SPARC, IA32, AMD64, IA64, etc.

To avoid ABA problems we could use bounded or unbounded tags [MO197], but tags require a 64-bit CAS for a 32-bit JVM, and a 128-bit CAS for a 64-bit JVM, so bounded tags aren't a viable alternative. 128-bit CAS operators aren't commonly available. On a 64-bit processor such as AMD64 we might know that linear addresses are really constrained to approximately 40 bits and use the remaining bits of the entry queue word as a tag, but eventually the AMD64 architecture will grow to support larger linear address spaces, so this solution is short-lived. In addition, an approximately 20-bit tag isn't generally considered sufficient to protect against ABA, as the tag can recycle too quickly. (Note that Microsoft uses this approach—with a 20-bit tag—in their AMD64 "SList" implementation).

Other mechanisms such as Michael's "hazard pointers" [MMHaz][MM04a], Michael's CAS-based LL-SC emulation [1], and Simon Doherty's [SD04] CAS-based LL-SC emulation can be used to avoid ABA-problems, but hazard pointers require thread-based root scanning (effectively emulating a garbage collected environment in C or C++) and the LL-SC emulations require a large number of CAS operations for each LL-SC pair.

In a type-safe garbage-collected environment such as Java we can organize the entry list as follows. The lock or monitor object contains a "head" field. This field is a reference (pointer) to an immutable "container" node. The container node holds a reference to the head of the entry list. Subsequent thread on the entry list are linked together via their per-thread "next" fields, forming a singly-linked list. A CAS instruction (compareAndSet in the Java language) is used to "swing" the head from one value to another. Critically, once a container node has appeared at the head of the list, it is never reused. Any operation that changes the head of the list will allocate a new container node and attempt to CAS that container into the head field. This practice avoids the ABA problem, but at the expense of additional allocation (for the container nodes) and the overhead of a garbage collected environment (to recover the defunct container nodes). A CAS-based push-pop with immutable container nodes is safe from the ABA problem. See [MMABA].

In our particular case—implementing an entry queue in a non-garbage collected environment—we can restrict concurrency to multiple push operations and a single pop operator by establishing the invariant that only the unlocking thread, while it still holds the monitor lock, can pop a successor from the list. This constraint is sufficient to prevent undesirable ABA interleavings. Since the dequeue operations occurs only while holding the monitor we can depend on the monitor's "mutex" properties itself to restrict the number of concurrent dequeue operations to just one. In general a simplistic "pop" operator is unsafe because of the risk of ABA corruption—when popping from the head, the head's "Next" field is not necessarily stable. (The "Next" links form the queue).

If we restrict popping to only the lock owner, then while the lock is held the interior of the list is stable. The head is volatile, but the interior and the "Next" links are stable. Critically, the head's Next field is stable and non-mutable, permitting "pop" to work safely. For the lock owner, the interior of the list is stable. As described, a simple push-pop scheme limits the entry queue order to a strict LIFO queue discipline.

Put another way, The key concept is that CAS-based push-pop operation implementing a singly-linked list is vulnerable to the ABA problem and list corruption. But if we permit concurrent multiple enqueue (push) operations and at most one concurrent dequeue (pop) operation, our mechanism is immune to ABA. We restrict to at-most-one-popping thread at at time by establishing the convention that only the holder of the outer lock can pop.

In general, we'd like to have the freedom to order the entry queue in any fashion:

a. A mixed-prepend (mostly LIFO) policy is usually more efficient that pure FIFO ordering because recently run threads tend to run again in the near future, reducing the cache reload transient. [HOT15]. LIFO provides better throughput, but FIFO is fair and intuitive.

b. Wakeup locality [SUN03] requires the ability to scan and dequeue arbitrary threads from the interior of the entry queue. Briefly, on SMT (hyperthreaded), multicore or NUMA systems when an unlocking thread picks a successor, it scans through the list of blocked threads and attempts to pick a thread that ran recently "near" the unlocking thread. "Near" can mean that the parked thread ran on the same NUMA node as the unlocking thread, or, in the case of a hyperthreaded, multicore, or CMT system, on a logical processor that shares a common L2 cache with the unlocking thread. By employing wakeup locality we improve the odds that a thread running on the same node/die will subsequently acquire the lock, decreasing coherence traffic and the movement of the cache lines containing the lock (and the data protected by the lock) over the interconnect and the memory busses. Larson [LAR98] refers to such rapid migration of cache lines between CPUs as "cache sloshing" or "cache bouncing".

Put another way, we bias the successor selection policy to preferentially pick a thread that recently ran on a processor element that shares cache with the CPU on which the exiting thread is running. Assuming that the operating system employs affinity scheduling, this improves the odds that (a) the successor will be scheduled onto a processor that has fast access to cache line containing the lock and the data protected by the lock, and (b) the successor will have residual affinity for the processor on which it resumes—that is, many of the successor's thread-private unshared cache lines will still be resident in the L1$ or shared L2$, reducing the cache-reload transient when the successor comes ONPROC.

The synchronization subsystem attempts to pick a successor thread that has residual affinity for the L2$ used by the exiting thread. Since the operating system scheduler attempts to preserve affinity, it's likely that the wakee will resume on the same node/die where the exiting thread ran. It's also likely that (a) the lock and the data protected by the lock remain in the shared L2$ and are still present when the wakee resumes, and (b) many of the thread-private unshared cache lines required by the wakee will still be resident in the L2$.

c. It's common to sort the entry queue by thread priority. By maintaining the entry queue in a sorted order the dequeue operation is very very efficient. The highest priority thread is immediately available at or near the head of the list, avoiding a potentially linear-time O(n) scan of the queue to locate the highest priority thread that would be required if the queue were not sorted.

As an alternative to strict LIFO push-pop queue ordering, we can make use of the fact that the while the lock is held the interior of the entry queue is stable (unchanging), while the front of the queue is volatile. While locked, the entry queue is prepend-only—arriving threads push themselves at the front. Given that, the unlocking thread can safely unlink a successor from the interior of the entry queue without risk of interference and without costly atomic instructions. Furthermore, the unlocking thread could reorder the threads on the list with the exception of the head, again, without employing atomic instructions. (For example, the unlocking thread might want to sort the recently arrived threads, which reside near the head, with the properly ordered threads that reside after the recently arrived threads). More generally, if, for performance reasons, the dequeue operation is limited to at most one CAS operation, it can either pop the head of the entry queue, or it can update the interior of the list, but it can't perform an update that moves the current head into the interior.

The approach described in the previous paragraph gives us more flexibility in ordering the queue, but we still are unable to reorder the queue at will because of the ABA restrictions related to the head.

Note that push-pop is only "half" lock free. Pushes are lock-free—they can always proceed, even if other push or pop operations in-progress stall or are preempted. But pops (or more precisely, dequeue operations), can only be performed by the monitor owner, and as such, they are implicitly protected by the mutual exclusion property of the monitor itself.

See "Appendix—Push-Pop"

C. Detach-Modify-Reattach (DMR)

In DMR an enqueuing thread pushes itself onto the entry queue with CAS. The front of the entry queue contains recently arrived (unsorted) threads followed by properly sorted threads. At unlock-time the unlocking thread uses the following procedure:

0. Release ownership of the lock.
1. detach the entire entry queue by using SWAP or CAS to install a "empty" value, typically NULL, into the entry queue word. The unlocking thread can then operate safely on the detached list without risk of interference.
2. repair the list order, sorting the recently arrived threads into the sorted segment using whatever queue discipline might be in effect.
3. select and unlink a successor from the sorted list
4. attempt to reattach the list, CASing over the putative "empty" value in the entry queue word. If more threads have arrived in the interim—since step (1)—then the unlocking thread detaches the new threads, merges them into th local list, and repeats step (4) as needed.
5. wake the successor dequeued in step (3).

Concurrent DMR operations can operate safely, so unlike push-pop (above), DMR permits the unlocking thread to release the lock before picking a successor. This enhances parallelism by reducing the effective length of the critical section—queue operation occur outside the lock's critical section. Unlike Oyama, multiple unlocking threads can attempt the DMR operation. One implication is that the queue ordering is not guaranteed to be perfect. Consider the following scenario where a LIFO queue discipline is in effect:

Thread T0 holds Lock L.
Thread T1 attempts to lock L and enqueues itself on L's entry queue.
Thread T2 attempts to lock L and enqueues itself on L's entry queue.
Thread T3 attempts to lock L and enqueues itself on L's entry queue. L's entry queue is now {T3,T2,T1} given the LIFO arrivals.
T0 unlocks L. TO uses DMR to detach {T3,T2,T1}.
Then, assuming a FIFO queue discipline, TO fixes the ordering to {T1,T2,T3}. TO dequeues T1, leaving {T2,T3} in its local list.
T0 stalls
Thread T4 locks L
Thread T5 attempts to Lock L and enqueues itself on L's entry queue.
Thread T6"
Thread T7"
L's entry queue now reads {T7,T6,T5}
T4 unlocks L, picking T5 to run and reattaching {T6,T7}
T0 resumes
T0 attempts to reattach {T2,T3}, but the CAS fails because {T6,T7} are on the entry queue. TO then detaches {T6,T7}, merges that sub-list with {T2,T3} yielding {T2,T3,T6,T7} and then reattaches {T2,T3, T6,T7}. Note that the queue ordering is not perfect, as T5 arrived after T2 but T5 was woken before T2. This condition occurred because T2 was temporarily "stranded" on a local (detached) list held by T0 and T2 was not visible to T4 when T4 released the and picked a successor.

Note that if an unlocking thread holding a large number of threads "in-hand" is preempted (say, at step (3)), other enqueue and dequeue operations can proceed despite the preempted thread. This makes DMR slightly less precise then OTY (given the possibility of sloppy queue order), but more robust in the face of preemption and stalls.

unlocking threads can tolerate reading a false-null entry queue where the entry queue is detached by some other thread because they are guaranteed that at least one thread will be woken as a successor. That is, if T1 detaches the entry queue (setting the entry queue word to NULL), T2 then locks unlocks the lock, T2 will then observe an empty entry queue. This is harmless as we know that T1 is in the process of waking a successor. Our protocol requires that only one successor need be ready (or be in the process of being made ready), so the responsibility of waking a successor belongs to T1 instead of T2.

Note that DMR doesn't provide the ability to dequeue a specific, designated, thread. At any given time a parked thread might be on the entry queue or off-list, on some thread's private local list.

This makes it impossible to promptly dequeue a known thread. The capability to unlink arbitrary threads from the entry queue isn't required for Java monitors or pthreads mutexes, however.

As an illustration of the DMR technique we provide "Appendix—DMR" as an example.

As a variation we could provide a hybrid DMR and push-pop implemenation as follows. Say we wanted to provide a mostly-prepend queue discipline. At enqueue-time, a thread sets a flag in its per-thread data structure indicating if it should be appended to the queue, or prepended. The thread then uses CAS to push (prepend) itself to the entry queue. At dequeue-time, the exiting thread checks the flag of the thread at the head of the entry queue. If the flag indicates prepend, the unlocking thread uses the a "pop" to simultaneously dequeue the successor and release ownership of the monitor. If the flag indicates append, the unlocking thread can use the DMR mechanism to detach the list, sort as needed, move the thread(s) marked for append to the end of the list, pick and dequeue a successor, and then reattach the list. That is, the unlocking thread will use either pop or DMR based on the append/prepend flag of the thread at the head of the entry queue. (See "Appendix—Hybrid", below). Alternately, if the append flag is set for the thread at the head of the list, the unlocking thread might simply pick and dequeue the first non-append thread from the interior of the entry queue. This is safe, as the interior of the queue is stable while the monitor is held—the queue is "push only". As yet another refinement, if the unlocking thread discovers that the thread at the head of entry queue has its append flag set, the unlocking thread might repair (reorder) the interior of the list (all the threads except the head), moving recently arrived threads with their append flag set to the tail. The unlocking thread would then select and dequeue the thread that immediately followed the head.

Remarks:

In all 3 schemes (OTY,push-pop and DMR) enqueuing threads use CAS to push themselves onto the front of the list. Pushing threads can encounter ABA interleavings, but the outcome is benign, so we say pushing is ABA-oblivious.

Oyama and push-pop both provide strict queue ordering, where DMR doesn't. Oyama, however, is somewhat more vulnerable than DMR to the situation where an unlocking thread is preempted while holding the detached entry queue.

Oyama and DMR perform entry queue manipulations (re-ordering, selecting) _after having released the lock. Push-pop performs queue manipulations while holding the lock, potentially decreasing parallelism and artificially increasing the effective length of the critical section.

Comparisons

```
                                      Oyama  push-pop DMR
-----------------------------------+------+-------+----+
Lock-Freedom for both enqueue & dequeue | both | both | both |
Dequeue_after unlock               | yes  | no    | yes |
Perfect ordering                   | yes  | NA    | no  |
Supports arbitrary reordering      | yes  | no    | yes |
Preemption during dequeue operation... |  |      |     |
  Inhibits Acquire                 | no   | yes   | no  |
  Inhibits Enqueue                 | no   | no    | no  |
Defers wakeup of prev arrived thread | yes | yes | yes |
Defers wakeup of subseq arrive thread | yes | yes | no |
-----------------------------------+------+-------+----+
```

* Safety of concurrent operations - possible interleavings

```
Operation(s)         Remarks
---------------------------------------
push || push         safe
push || pop(1)       [R1]
push || pop || pop   unsafe - risks ABA corruption
OTY || pop           unsafe
DMR || pop           unsafe
push || OTY          safe
push || DMR          safe
DMR || DMR           safe
push || unlink-interior [R2]
```

R1: unsafe in the general case, but safe as long as there can be at most on popping thread. We can satisfy the only-one requirement by virtue of the mutex property of the monitor itself—only the monitor owner can pop, and there can be at most one owner. A strict push-pop mechanism, where the entering thread pushes and the exiting thread pops (and simultaneously drops the lock) permits only strict LIFO ordering.

R2: Updates to the interior of the entry queue can be performed only by the monitor owner. While the monitor is locked the head of the entry queue is unstable and the interior is stable. The monitor owner can safely unlink a successor without risk of interference.

Lock-Free queues can also be applied to the Relaxed-Lock Protocol. [RLP01][DIC04]. Refer to "Appendix—RAT2", "Appendix—RATV" and "Appendix—RLP" for examples. These forms are "half" lock-free. Enqueue operations can proceed concurrently even when other threads might be preempted or stalled.

The DMR mechanism could also be called the "CAS-CAS" mechanism or "SWAP-CAS" mechanism, as at exit-time, a first atomic detaches the list and a subsequent atomic operation ratifies that the list is unchanged, and reattaches the residual list. Depending on the particular embodiment, either the 1st or 2nd atomic can clear the entry queue's "LSB" bit, releasing ownership of the lock. To increase parallelism (and decrease the interval where the monitor is locked) it is often advisable to clear the lock bit in the first atomic. This, however, permits multiple DMR "merge" operations to operate in parallel.

Above, we described push-OTY, push-pop and push-DMR. Push-OTY, for instance, indicates that an enqueuing thread in Lock( ) will push, and a dequeueing thread un Unlock( ) will use modified OTY to unlink a successor from the entry list. In addition to the 3 above, OTY-OTY and DMR-DMR are viable mechanisms.

For brevity of exposition most of our examples implement the entry queue as a simplistic singly-linked-list of threads. That doesn't have to be the case, however.

In all cases, the recently arrived threads (or "RATs") are pushed at the head of entry queue. Because we push, the RATs segment of the list is LIFO. Depending on our implementation and the queue discipline in effect, we might want to sort the RATs into some other. Typically, the EntryQueue would point to a chain of RATs (unsorted) followed by a chain of properly sorted threads. For the sorted segment of the list have the freedom to use more elaborate list structures:
a. Singly linked list
b. Doubly linked list
c. Circular doubly linked list
d. Circular singly linked list with the final RAT pointing to the logical tail of the sorted segment. This organization provides fast constant-time access to the head and tail of sorted segment. Pictorially

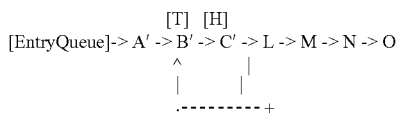

A, B, C are the RATs.
L, M, N, 0 are sorted.
L is the tail of the sorted section.
M is the head of the sorted section.
M is accessible via L with just one load.
Using this structure, we can prepend before the head (push), append after the tail, and dequeue the head (pop) using constant-time 0(1) operations.

Appendix

An Example of the ABA Problem

Lets say we permit concurrent push and pop operations implemented as follows:
pushThread (List * L, Thread * T)
  for (;;) {
    Thread * head;
    T->Next=head=L->EntryQueue;
    if (CAS (&L->EntryQueue, L, T)==L) {
      return;
    }
    // Interference—simply retry the operation
  }
popThread (List * L)
  for (;;) {
    Thread * head;
    Thread * penult;
    head=L->EntryQueue;
    if (head==NULL) return NULL;
    penult=head->Next;
    // Location #1
    if (CAS (&L->EntryQueue, head, penult)==head) {
      return head;
    }
    // Interference—retry the operation
  }
These push and pop operators work properly if there is not interleaving of execution. Concurrent push-pop operations can result in the ABA problem, however. For example:
1. lets say that List->EntryQueue is initially {A->B->C}
2. Thread U attempts to pop( ) from the list.
  U runs popThread( ) above, and observes A as "head" and B as "penult".
  U then stalls or is preempted at Location #1, above.
3. Thread X pops A
4. Thread Y pops B
5. Thread D pushes D
6. Thread A pushes A. The EntryQueue is now {A->D-C}
7. Thread U resumes and the CAS completes successfully, installing {B} as the head of the list. B is now present on the list when it shouldn't be, and D is not on the EntryQueue, while it should be. The list is now corrupt.

REFERENCES

The following references are hereby incorporated by reference in their entirety.
[LB96] A Guide to Multithreaded Programming—The Threads Primer B. Lewis, D. Berg Prentice Hall, 1996
[POS04] ANSI/IEEE Single-Unix-Specification, POSIX1003.1, 2004 edition. http://www.unix-systems.org/version3/ieee_std.html
[JVM97] The Java Virtual Machine Specification T. Lindholm, F. Yellin Addison-Wesley 1997
[SOL01] Solaris Internals—Core Kernel Architecture J. Mauro, R McDougall Prentice-Hall, 2001.
[SOLMT] Multi-Threading in the Solaris Operating Environment http://wwws.sun.com/software/whitepapers/solaris9/multithread.pdf
[AGE99] An efficient meta-lock for implementing ubiquitous synchronization. O. Agesen et al. ACM SIGPLAN International Conference on Object-Oriented Programming Systems, Languages and Applications (OOPSLA), 1999.
[LAR98] Larson P.-Å., Krishnan M., Memory Allocation for Long-Running Server Applications, International Symposium on Memory Management (ISMM '98), 1988, 176-185. ftp://ftp.research.microsoft.com/users/palarson/ismm98_lk.ps
[RLP01] Dave Dice Implementing Fast Java Monitors with Relaxed-Locks. USENIX JVM'01 http://www.usenix.org/events/jvm01/full_papers/dice/dice.pdf
[DIC04] Relaxed Lock Protocol U.S. Pat. No. 6,735,760
[STB] http://j2se.east/~dice/patents/SUN041068-adaptive-spin-then-block/spin-disco.txt
[SUN03] US Patent application—Sun case #SUN030125 Method and Process for Selecting Processes for Execution. (Describes "wakeup locality").
[HOT15] http://java.sun.com/j2se/1.5.0/docs/guide/vm/thread-priorities.html
[MM04a] Maged M. Michael Practical Lock-Free and Wait-Free LL/SC/VL Implementations Using 64-Bit CAS Research Report RC23220, IBM Thomas J. Watson Research Center, May 2004. Also published in DISC'04. http://www.research.ibm.com/people/m/michael/RC23220.pdf http://www.research.ibm.com/people/m/michael/RC23089.pdf http://www.research.ibm.com/people/m/michael/disc-2004.pdf
[MMHaz] Maged M. Michael Hazard Pointers: Safe Memory Reclamation for Lock-Free Objects IEEE TPDS (2004) IEEE Transactions on Parallel and Distributed Systems 15(6):491-504, June 2004. http://www.research.ibm.com/people/m/michael/ieeetpds-2004.pdf
[MMABA] Maged Michael ABA Prevention Using Single Word Instructions, IBM Research Report RC23089, January 2004 http://www.research.ibm.com/people/m/michael/RC23089.pdf
[MM03] Maged M. Michael CAS-Based Lock-Free Algorithm for Shared Deques Euro-Par 2003 The Ninth Euro-Par Conference on Parallel Processing, LNCS volume 2790, pages 651-660, August 2003. http://www.research.ibm.com/people/m/michael/europar-2003.pdf

[SD04] Simon Doherty, Maurice Herlihy, Victor Luchangco, Mark Moir Bringing Practical Lock-Free Synchronization to 64-bit Applications. PODC'2004 http://doi.acm.org/10.1145/1011767.1011773

[OTY] Oyama, Taura, Yonezawa Executing Parallel Programs with Synchronization Bottlenecks Efficiently University of Tokyo, 1998. http://web.yl.is.s.u-tokyo.ac.jp/~oyama/publications/OyamaPDSIA99.pdf.

[DL04] Doug Lea The Java.util.concurrent Synchronizer Framework. 2004. http://gee.cs.oswego.edu/dl/papers/aqs.pdf

[RAY86] Algorithms for Mutual Exclusion M. Raynal MIT Press, 1986

[AND01] Lamport on Mutual Exclusion: 27 Years of Planting Seeds J. Anderson Proceedings of the 20th Annual ACM Symposium on Principles of Distributed Computing (PODC). August 2001. http://www.cs.unc.edu/~anderson/papers/lamport.pdf

[Her91] Wait-free Synchronization Maurice Herlihy ACM Transactions on Programming Languages and Systems (TOPLAS) Volume 13, Issue 1. January 1991 http://doi.acm.org/10.1145/114005.102808

[VAL95] John Valois Lock-Free Data Structures Ph. D. Dissertation—Ressselaer Polytechnic Institute, 1995.

[GRE99] Michael Greenwald Non-Blocking Synchronization and System Design. Ph. D. Dissertation—Stanford University, 1999.

[FRA03] Keir Fraser Practical Lock-Freedom Ph. D. Dissertation—King's College, University of Cambridge, 2003. (Final version, February 2004) http://www.cl.cam.ac.uk/~kaf24/papers/phd.pdf

[MLH94] Peter Magnusson, Anders Landin, Erik Hagersten Queue Locks on Cache Coherent Multiprocessors, 8th International Parallel Processing Symposium (IPPS), Mexico 1994. file://sics.se/pub/SICS-reports/Reports/SICS-R--94-07--SE.ps.Z

[TC93] Travis Craig Building FIFO and Priority-Queue Spin Locks from Atomic Swap. University of Washington, Dept of Computer Science and Engineering. Technical Report TR-93-02-02, 1993.

[MCS91a] J. M. Mellor-Crummey, M. L. Scott Synchronization without Contention. In Proc. 4th ASPLOS 1991.

[MCS91b] J. M. Mellor-Crummey, M. L. Scott Algorithms for Scalable Synchronization on Shared-Memory Multiprocessors. ACM TOCS1991. [This describes the famous "2Q" algorithms]

[NBS02] Michael Scott Non-Blocking Timeout in Scalable Queue-Based Spin Locks University of Rochester, Dept of Computer Science. Technical Report #773, February 2002. http://www.cs.rochester.edu/u/scott/papers/2002_TR773.pdf Published in 21st ACM Symp. on Principles of Distributed Computing (PODC), July, 2002. http://doi.acm.org/10.1145/571825.571830

[MSQ96] M. M. Michael and M. L. Scott. Simple, Fast, and Practical Non-Blocking and Blocking Concurrent Queue Algorithms 15th ACM Symp. on Principles of Distributed Computing, May 1996. http://doi.acm.org/10.1145/248052.248106 http://www.cs.rochester.edu/u/michael/PODC96.html

[MOI97] Mark Moir Practical Implementations of Non-Blocking Synchronization Primitives PODC'97 http://www.podc.org/podc97/papers/moir.ps [describes the "bounded tag" and "unbounded tag" schemes]

[ELM04] Edya Ladan-Mozes, Nir Shavit An Opportunistic Approach to Lock-Free LIFO Queues DISC'2004

[FOM04] Mikhail Fomitchev, Eric Rupert Lock-Free Linked Lists and Skip Lists PODC'04. http://doi.acm.org/10.1145/1011767.1011776

[PAM04] Paul A. Martin A Practical Lock-Free Doubly-linked List 2004 http://archivist.eng/docs/2004/600-749/2004-0642/main.pdf

[FAR98] Mohammad Farook, Peter Graham Managing Long Linked Lists Using Lock-Free Techniques HPCS'98 http://www.cs.umanitoba.ca/~pgraham/papers/hpcs98.pdf

[FH04] Keir Fraser, Tim Harris Concurrent Programming without Locks 2004 http://www.cl.cam.ac.uk/Research/SRG/netos/papers/2004-cpwl-submission.pdf

[SS04] William Scherer, Michael Scott Nonblocking Concurrent Data Structures with Conditional Synchronization DISC'2004 http://www.cs.rochesteredu/u/scott/papers/2004_DISC_dual_DS.pdf

[HOH02] Michael Hohmuth Pragmatic non-blocking synchronization for real-time systems Ph.D. dissertation, Uni Dresden, October 2002. http://os.inf.tu-dresden.de/~hohmuth/prj/phd.pdf Appendix Modified Oyama and Enhanced Oyama We now present a slightly longer description of modified Oyama (mentioned above) as well as another variation on Oyama.

Modified Oyama

The monitor holds a "queue word" containing an "exclusive access bit" (X-bit) and a pointer to the head of the entry list. In some embodiments we may also encode the "outer lock" bit (L-bit) in that same queue word. That is, the outer lock indication may, variously, be colocated in the queue word, or it may reside in a separate monitor word.

Threads enqueue themselves on the entry list by way of a CAS-based "push" operation. The "push" prepends the thread onto the entry list. The CAS-based push is extremely simple—the thread simply fetches the monitor queue word, stores that queue word value in the thread's "next" field, and then attempts to use CAS to swing the queue word from the previously fetched value to the address of the pushing thread. If the CAS fails the thread simply retries the "push" operation. In this way a entering thread pushes itself onto the front of a list identified by the queue word. Entering threads never change the X-bit value in the queue word. Critically, a push can be accomplished without the need to acquire the X-bit. Locking (contending) threads simply prepend themselves onto the list and then park.

Exiting threads release the outer lock, select and dequeue a successor from the entry list, and then unpark that successor. Note that the operations don't necessarily need to be performed in that particularly order, and some operations might be performed in a compound fashion with CAS. The X-bit serves a "lock", which indicates that a dequeue is in-progress. Only one thread may set or "own" the X-bit at any given time. Furthermore, only exiting threads set the X-bit. Once set by an exiting thread, the X-bit protects against (prevents) other concurrent dequeue operations, so, WRT the dequeueing thread, the only possible source of concurrency and interference will be "push" enqueue operations performed by entering threads. Any thread can push (enqueue) but only thread that set the X-bit can dequeue or otherwise mutate the entry list.

To dequeue a successor an exiting thread first attempts to set the X-bit with CAS. If an unlocking thread finds that the X-bit is already set then that unlocking thread can simply return without dequeuing and waking a successor—because the X-bit is set another thread must be in the midst of dequeueing a successor. (We don't need yet another successor; one is sufficient to guarantee the required liveness and progress properties for the monitor). If an exiting thread observes that the X-bit is clear, it attempts to detach the list with CAS, leaving the X-bit set and all the remaining queue word bits NULL. The exiting thread then, optionally, repairs the list order applying whatever queue discipline we chose to the recently arrived threads, possibly merging the recently arrived threads found at the front of the list into the stable list segment at that tail. Next, the exiting thread selects and dequeues a successor thread from the list. After dequeueing a successor, the unlocking thread then attempts to reattach the list and clear the X-bit with a single CAS. More precisely, the exiting thread employs CAS to attempt to change the queue word from (Head=NULL:X=1) to (Head=List:X=0). If more threads have arrived (enqueued) in the interim, the CAS will fail and the unlocking thread will detach that segment and re-merge, repeating as necessary.

For example, if thread T1 attempts to enqueue itself while the queue is locked by some exiting thread T2, T1 simply pushes itself onto the front of the queue, delegating the responsibility for *properly* enqueueing T1 to T2. T2, when it attempts to clear the X-bit, will notice T1 and place T1 in the proper location in the queue. In this way the queue word serves both as a queue of threads waiting to enter the monitor, _and_ as the Oyama deferred/delegated action queue.

At any given time the entry queue consists of a prefix segment of zero or more recently arrived threads, followed by the sorted body of the list. Because it is constructed with a CAS-based push, the prefix always takes the form of a singly-linked list. The sorted body of the list could be organized as a singly-linked list, a circular doubly-linked list, or some more elaborate list organization.

Enhanced Oyama

The modified Oyama is distinguished by using a CAS-based push at enqueue time, and an Oyama-like mechanism at dequeueue-time. The "enhanced" form uses modified Oyama at both enqueue-time and dequeue-time.

In the enhanced form a monitor holds an separate entry list word (which points to the head of the entry list), and a contention-word. The contention-word contains an L-bit (outer lock indicator), an X-bit and a pointer to the head of a simple singly-linked list of recently arrived threads. The list is ordered by arrival time, with the most recently arrived threads nearest the head of the list. The list of recently arrived threads consists of threads whose enqueue operation was deferred because the X-bit was held by some other thread—we could just as well call the "recently arrived thread list" the "deferred enqueue list". In this variation the entry list word is never accessed with atomics (CAS), so the organization of the entry list and the word (or words) that describe the list are not restricted by the need to encode a list designator in a single word.

As a notational convenience, we write (List=T5:L=1:X=0) to describe a contention-word encoded with the recently arrived thread list anchored at T5, the L-bit set to 1, and the X-bit set to 0.

(Enqueue Operation)

To enqueue itself, a thread first reads the contention-word. If the L-bit is clear, the thread uses CAS to attempt to swing the L-bit in the contention-word from 0 to 1. If successful, the thread owns the outer-lock—it abandons the enqueue attempt and allows control to pass into the critical section protected by the monitor. If the CAS fails, the thread retries the enqueue operation.

Otherwise, if the L-bit is set, the enqueuing thread T2 examines the X-bit in the fetched contention-word value.

1. If the X-bit is set, then some other thread currently has exclusive access to the entry list. In this case the entering thread uses CAS to try to "push" itself (prepend itself) onto the list of recently arrived threads anchored by the contention-word. In detail, the thread stores the previously-fetched contention-word value in it's "next" field and then attempts to CAS its own address or-ed with the L-bit and X-bit from the previously fetched contention-word value, into the contention-word. (Of special note, if the X-bit is set and thread pushes itself, it propagates the existing X-bit and L-bit into the new contention-word value). If successful, the thread has entered itself onto the list of recently arrived threads, and may then park itself. If the CAS fails, then the contention-word has changed, so the thread retries the enqueue operation. (That is, it starts by re-reading the contention-word and repeats as necessary).

2. If the X-bit is clear, the threads uses CAS to try to change the X-bit in the contention-word from 0 to 1. By convention, if the X-bit is clear, then the recently arrived list subfield in the contention-word must also be NULL. This constraint isn't strictly required by the algorithm, but it makes design slightly more simple. If the CAS fails, the thread simply retries the entire enqueue operation. (Critically, this isn't futile spinning—if the CAS fails then some other thread changed the contention-word, which implies that the other thread made progress in the interval between the load and the CAS. As such, our method is lock-free. This argument applies to all the other cases in the algorithm where we attempt a CAS and then, if the CAS fails, recycle and retry the operation). If this CAS succeeds, the enqueueing thread T2 has exclusive access to the entry list and may enqueue itself without risk of concurrent interference from other threads.

After enqueueing itself the thread will attempt to clear the X-bit with CAS. We call this phase the "restoration operation".

A number of possible case arise:

a. In the normal case, with no concurrent operations have changed the contention-word, the L-bit in the contention-word remains set, and no threads have enqueued themselves on the recently arrived list, so the contention-word contains the same value that T2 recently stored into it with CAS (that is, the same value T2 stored into the contention word with CAS when it originally set the X-bit at the top of step 2). Specifically, the contention-word will be (List=NULL:L=1:X=1). Since the contention-word value is unchanged, the CAS to clear the X-bit in the contention word is successful, and T2 may then park itself. Specifically, T2 CASes the contention-word from (List=Null:L=1:X=1) to (List=Null:L=1:X=0).

b. if more entering threads T3 and T4 arrived while the enqueuing thread T2 held exclusive access and those threads enqueued themselves on the deferred enqueue list formed by the contention-word, the CAS used to clear the X-bit will fail and the thread T2 attempting to clear the X-bit will notice the list of newly arrived threads in the contention-word. In other words, T2 attempts to CAS the contention-word from (List=Null:L=1:X=1) to (List=Null:L=1:X=0), but the CAS fails because the contention word word currently contains (List=T4:L=1:X=1).

In this case T2 uses CAS to "break off" or detach the singly-linked list of recently arrived threads (T3 and T4 in this example), but continues to propagate the L-bit and X-bit values currently in the contention-word. In detail, T2 uses CAS to try to swing the contention word from (List=T4:L=1:X=1) to (List=NULL:L=1:X=1). Once T2 successfully detaches the list of recently arrived threads it then transfers or enqueues those threads onto the properly-sorted entry list. (Recall that T2 still has exclusive access to the entry list). T2 then restarts the restoration operation.

c. While T2 held exclusive access, the lock owner T1 may have released the lock and cleared the L-bit in the contention-word. At the start of the restoration phase T2 will notice that the L-bit is clear. In this case T2 dequeues itself from the entry list (in anticipation of immediately acquiring the lock), and then uses a single CAS to try to (a) swing the L-bit to 1, and (b) clear the X-bit. If the CAS is successful, T2 holds the lock and can proceed into the critical section. If the CAS fails, T2 retries (reruns) the restoration operation.

Alternately, if T2 observes the L-bit clear it could try to CAS the L-bit to 1, but keep the X-bit set. If the CAS failed, T2 would retry the restoration operation. If the CAS succeeded then T2 holds the outer lock. T2 then must dequeue itself from the entry list. Next, T2 would attempt to clear the X-bit. If the contention-word indicated the presence of recently arrived threads, T2 would loop, detaching those threads and transferring them to the entry list. Finally, when no recently arrived threads were discovered, T2 would clear the X-bit but leave the L-bit set to 1. T2 holds the outer lock—it could then proceed into the critical section.

d. Conditions (b) and (c) could arise at the same time. T2 could observe a contention-word of the form (List=T4:L=0:X=1). In other words T2 might notice newly arrived threads _and_ that the outer lock had been released. In this situation T2 would use CAS to detach the list, as described above in (b), and transfer the recently arrived threads to the entry list. At this point the contention-word would be of the form (List=Null:L=0:X=1). T2 could then retry the restoration phase, in anticipation of encountering condition (c).

(Dequeue Operation)

An exiting thread T1 that needs to extract a successor from the entry list will fetch the contention word and examine the X-bit. For the purposes of brevity, we'll assume that the exiting thread has already cleared the L-bit, releasing the outer-lock, before it attempts to dequeue a successor. In practice, various implementations might merge the operations below with the CAS that clears the L-bit.

1. If clear, the exiting thread attempts to CAS the contention from (List=Null:L=*:X=0) to (List=Null:L=*:X=1) to set the X-bit and acquire exclusive access to the entry list. Note that the L-bit may be 0 or 1—another thread may have acquired the lock since T1 released it. If the CAS fails, the thread re-reads the contention-word and retries the dequeue operation. The CAS might fail because the L-bit changes or the X-bit is set by some other thread. If the CAS succeeds, the thread has exclusive access to the entry list and can safely dequeue from the entry list without risk of interference from other threads. (At most one thread, of course, can have exclusive access to the entry list at any one time).

Once T1 has dequeued a successor it attempts to clear the X-bit, using CAS to try to "swing" the contention-word from (List=Null:L=x:X=1) to (List=Null:L=x:X=0). If our algorithm has not yet cleared the L-bit, it can also clear the L-bit using the same CAS that clears the X-bit. If the CAS fails then other locking threads must have pushed themselves onto the deferred enqueue list. In this case T2 uses CAS to install (List=Null:L=x:X=1) into the contention-word, detaching the deferred enqueue list. T1 then transfers the contents of the deferred enqueue list to the entry list, sorting and positioning the threads as required by the prevailing queue discipline. T1 then re-attempts clear the X-bit. Of course yet more threads may have arrived, in which case T1 must loop and continue to transfer those threads to the entry list until the time T1 discovers the recently arrived list is empty (Null).

2. Critically, if T1 observes that the X-bit is set then T1 can abandon the attempt to extract and unpark a successor. No further action is required of the exiting thread to ensure liveness and succession. Some other thread, say T8, has exclusive access to the entry list and is either in the act of enqueueing itself of dequeueing a successor.

a. If the exclusive-access holder T8 is an exiting thread then it is dequeueing some successor. T1 is guaranteed that a successor will subsequently be made ready by T8.

b If the exclusive-access holder T8 is an entering thread, then it is attempting to enqueue itself. In this case, since T1 has already cleared the L-bit in the contention word, T8 will later observe that the L-bit is clear and will attempt to acquire the outer lock.

What is claimed is:

1. In a computerized device, a method for controlling access to a resource by a group of threads requiring access to the resource via a monitor, the method comprising:

providing exclusive access to the resource within the computerized device to a first thread by allowing the first thread exclusive access of the monitor;

maintaining an entry list of threads that are awaiting access to the monitor using a block-free list joining mechanism that allows threads to join the entry list of threads without threads having to exclusively lock the entry list of threads and without blocking operation of the threads during the process of joining the entry list of threads; and upon completion of access to the resource by the first thread, operating the first thread to manipulate the entry list of threads to identify a successor thread within the entry list of threads as being a candidate thread to obtain exclusive access of the monitor for gaining exclusive access to the resource, wherein maintaining an entry list of threads that are awaiting access to the monitor using a block-free list joining mechanism comprises:

maintaining a list available indicator identifying if a second thread is presently accessing the entry list of threads to join the entry list of threads;

enabling a third thread to join the list of entry threads while the second thread is presently accessing the entry list of threads by performing the operations of:

determining that the list available indicator identifies that a second thread is presently accessing the list of threads;

determining if a join attempt thread identity area contains a thread identity of a former thread that attempted to join the list of entry threads while the second thread was presently accessing the entry list of threads, and if so, providing the thread identity of the former thread in a next thread identity area associated with the third thread; and providing an identity of the third thread in the join attempt thread identity area to create a join list of threads that attempted to join the list of entry threads while the second thread is presently accessing the entry list of threads, the join list of threads including the third thread and any former threads that attempted to join the list of entry threads while the second thread was presently accessing the entry list of threads.

2. The method of claim 1 wherein maintaining an entry list of threads that are awaiting access to the monitor using a block-free list joining mechanism comprises:
   upon completion of the second thread joining the entry list of threads, the second thread identifying that the join list of threads identifies threads that attempted to join the list of entry threads while the second thread was presently accessing the entry list of threads, and in response, joining each thread identified in the join list of threads to the entry list of threads awaiting access to the monitor.

3. The method of claim 2 wherein joining each thread identified in the join list of threads to the entry list of threads awaiting access to the monitor comprises:
   traversing the join list of threads, beginning with a thread identified in the join attempt thread identity area and extending to each thread identified by the next thread identity area associated with each former thread in a join list of thread, to join each thread in the list of former threads into the entry list of threads awaiting access to the monitor.

4. The method of claim 2 wherein:
   the list available indicator is a storage location in memory associated with the computerized device;
   the join attempt thread identity area is associated with the list available indicator;
   the next thread identity area is a next thread field in a thread structure associated with each thread; and
   wherein providing the thread identity of the former thread in a next thread identity area associated with the third thread, and providing an identity of the third thread in the join attempt thread identity area collectively result in creating a list of thread identities including the third thread and the former thread, the list of thread identities allowing an identification of threads that attempted to join the list of entry threads while the second thread is presently accessing the entry list of threads.

5. The method of claim 1 wherein enabling a third thread to join the list of entry threads comprises:
   enabling the third thread to join the list of entry threads while the second thread is presently accessing the entry list of threads without blocking the third thread from execution and without requiring the third thread to identify specific instructions to perform to join the list of entry threads.

6. A computerized device comprising: a memory; at least one processor; a resource;
   an interconnection mechanism coupling the memory, the at least one processor and the resource;
   wherein the memory is encoded with a group of threads and a synchronization subsystem that controls access to the resource by the group of threads requiring access to the resource via a monitor, when those threads execute on the processor by causing the computerized device to perform the operations of:
   providing exclusive access to the resource within the computerized device to a first thread by allowing the first thread exclusive access of the monitor;
   maintaining an entry list of threads in the memory that are awaiting access to the monitor using a block-free list joining mechanism in the synchronization subsystem that allows threads to join the entry list of threads without blocking operation of the threads during the process of joining the entry list of threads, the block-free list joining mechanism allowing threads to join the entry list of threads without threads having to exclusively lock the entry list of threads during the process of joining the entry list of threads; and
   upon completion of access to the resource by the first thread, operating the first thread to manipulate the entry list of threads to identify a successor thread within the entry list of threads as being a candidate thread to obtain exclusive access of the monitor for gaining exclusive access to the resource,
   wherein when the computerized device performs the operation of maintaining an entry list of threads that are awaiting access to the monitor using a block-free list joining mechanism, the computerized device performs the operation of:
   allowing any thread that requires to join the entry list of thread to perform a push operation to join the entry list of threads to allow at least two threads to concurrently push themselves onto the entry list of threads so that the at least two threads do not have the block execution when joining the entry list of threads.

7. The computerized device of claim 6 wherein when the computerized device performs the operation of operating the first thread to manipulate the entry list of threads to identify a successor thread within the entry list of threads as being a candidate to obtain exclusive access of the monitor to gain exclusive access to the resource, the computerized device performs the operation of:
   allowing only a thread that has exclusive access of a monitor to perform a pop operation to pop the candidate thread off of the entry list of threads prior to releasing of the monitor.

8. In a computerized device, a method for controlling access to a resource by a group of threads requiring access to the resource via a monitor, the method comprising:
   providing exclusive access to the resource within the computerized device to a first thread by allowing the first thread exclusive access of the monitor;
   maintaining an entry list of threads that are awaiting access to the monitor using a block-free list joining mechanism that allows threads to join the entry list of threads without blocking operation of the threads during the process of joining the entry list of threads; and
   upon completion of access to the resource by the first thread, operating the first thread to manipulate the entry list of threads to identify a successor thread within the entry list of threads as being a candidate thread to obtain exclusive access of the monitor for gaining exclusive access to the resource,
   wherein maintaining an entry list of threads that are awaiting access to the monitor using a block-free list joining mechanism comprises:
   enabling a second thread to join the list of entry threads while the first thread has exclusive access of a monitor associated with the resource by:
   determining if the list of entry threads is empty, and if so, adding the second thread as a first member of the list of entry threads, and if the list of entry threads is not empty, performing the operations of:
   detaching the non-empty list of entry threads from a starting location of the list of entry threads to create a private list of empty threads modifiable by the second thread;

operating on the private list of entry threads to join the second thread to the private list of entry threads; and reattaching the private list of entry threads to the starting location of the list of entry threads so that the private list of entry threads to which the second thread has joined becomes the list of entry threads awaiting access to the monitor.

9. The method of claim 8 wherein reattaching the private list of entry threads to the starting location of the list of entry threads comprises identifying that a new list of entry threads containing at least one thread identity has been created since detaching the list of entry threads.

10. The method of claim 9 wherein reattaching the private list of entry threads to the starting location of the list of entry threads further comprises detaching the new list of entry threads.

11. The method of claim 10 wherein reattaching the private list of entry threads to the starting location of the list of entry threads further comprises merging the private list of entry threads with the new list of entry threads to add the new list of entry threads into the private list of entry thread.

12. The method of claim 11 wherein reattaching the private list of entry threads to the starting location of the list of entry threads further comprises attempting to reattach the private list of entry threads to the starting location of the list of entry threads by repeating the operations of identifying that a new list, detaching the new list, and merging the private list until no new list entry threads has been created since detaching the list of entry threads.

* * * * *